United States Patent [19]

Kashimoto et al.

[11] Patent Number: 5,666,479
[45] Date of Patent: Sep. 9, 1997

[54] ISSUE PROCESSING SYSTEM AND METHOD FOR A RIGHT TO USE A DATA PROCESSSING SYSTEM RESOURCE

[75] Inventors: Shuji Kashimoto, Numazu; Hirofumi Uchida, Mishima, both of Japan

[73] Assignee: Fujitsu Limited, Kawasaki, Japan

[21] Appl. No.: 274,153

[22] Filed: Jul. 14, 1994

Related U.S. Application Data

[63] Continuation of Ser. No. 707,767, May 30, 1991, abandoned.

[30] Foreign Application Priority Data

May 30, 1990 [JP] Japan ................................ 2-140908
Jun. 12, 1990 [JP] Japan ................................ 2-153340

[51] Int. Cl.⁶ .................... H04L 12/00; G06F 11/00
[52] U.S. Cl. .................... 395/180; 395/670; 395/680; 395/200.55; 395/181; 395/182.16; 395/184.01
[58] Field of Search ........................ 395/650, 700, 395/670, 680, 182.16, 180, 184.01, 181, 200.01

[56] References Cited

U.S. PATENT DOCUMENTS

| | | | |
|---|---|---|---|
| 4,321,666 | 3/1982 | Tasan et al. | 364/200 |
| 4,356,546 | 10/1982 | Whiteside et al. | 364/200 |
| 4,742,447 | 5/1988 | Duvall et al. | 395/375 |
| 4,835,673 | 5/1989 | Rushby et al. | 364/200 |
| 4,835,674 | 5/1989 | Collins et al. | 364/200 |
| 4,914,657 | 4/1990 | Walter et al. | 371/11.3 |
| 4,961,224 | 10/1990 | Yung | 380/25 |
| 5,003,464 | 3/1991 | Ely et al. | 364/200 |
| 5,029,169 | 7/1991 | Smyk | 371/19 |
| 5,109,486 | 4/1992 | Seymour | 395/200 |
| 5,163,131 | 11/1992 | Row et al. | 395/200 |
| 5,165,018 | 11/1992 | Simor | 395/200 |
| 5,216,675 | 6/1993 | Melliar-Smith et al. | 371/32 |

OTHER PUBLICATIONS

Lan et al., "Virtual Resource System: Analysis for Resource Management in Fault–Tolerant Distributed Computer Systems," Second International Conference on Computers and Applications, Jun. 23–27, 1987, Peking, China, pp. 97–103.

Uppaluru et al., "Reliable Servers in the Jasmin Distributed System," The 7th International Conference on Distributed Computing Systems, International Conference on Distributed Computing Systems, Sep. 21–25, 1987, Berlin, West Germany, pp. 105–112.

Borg et al., "Fault Tolerance Under Unix," AMC Transactions on Computer Systems, vol. 7, No. 1, Feb. 1989, New York, NY, pp. 1–24.

(List continued on next page.)

*Primary Examiner*—Alvin E. Oberley
*Assistant Examiner*—Michael T. Richey
*Attorney, Agent, or Firm*—Staas & Halsey

[57] ABSTRACT

In an issue processing system for a right to use a resource in a data processing system having a global service program based on a fault-tolerant method providing a current processing server and a spare processing server, the resource management server includes: a re-transmission examination unit for examining a message from the processing server and determining whether it is a re-transmitted message based on a discriminator attached to the message for requesting acquirement of the right to use the resource; a discriminator addition unit for adding the discriminator to the message for requesting the right to use to be issued when that right to use is registered; and a right to use examination unit for examining whether the message is already registered based on a previous message for the re-transmission by referring to the discriminator attached by the discriminator addition unit when the message indicates the re-transmission message based on the detection of the re-transmission examination unit; wherein, when the examination unit judges that the right to use is already registered, the above registered right to use is invalidated, and a new right to use is registered into the nuclear program and the new right to sue is issued to the processing server.

6 Claims, 26 Drawing Sheets

OTHER PUBLICATIONS

"Rose – A Reliable Operating System Environment" by Tony P. Ng., IEEE 1989.

"A Distributed Algorithm for Fault Diagnosis in Systems with Soft Failures" by Che–Liang Yang et al, IEEE 1988.

"Reliable Client–Server Communication in Distributed Programs" by K. Ravindran et al, IEEE 1989.

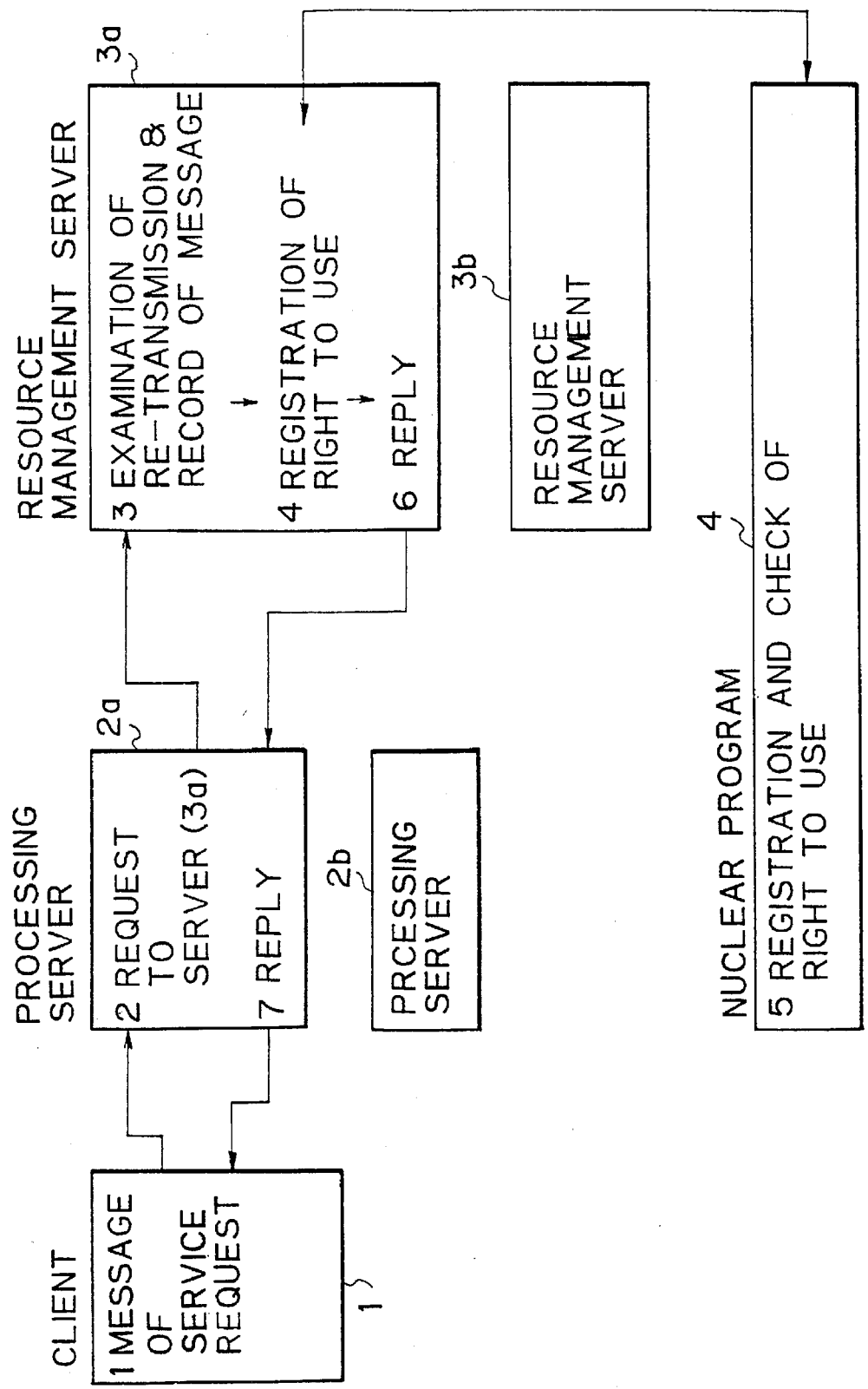

| Fig. 7A | Fig. 7B |

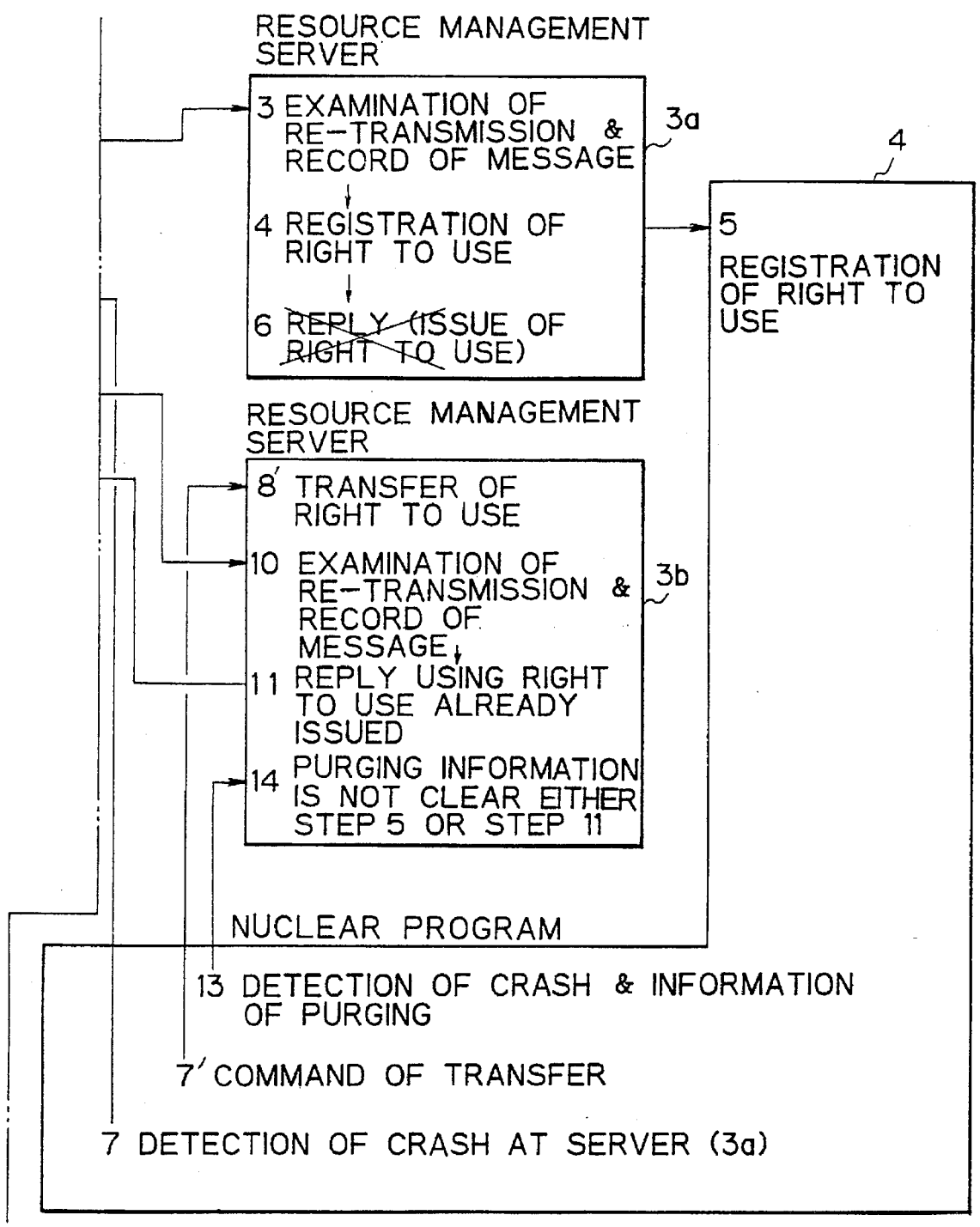

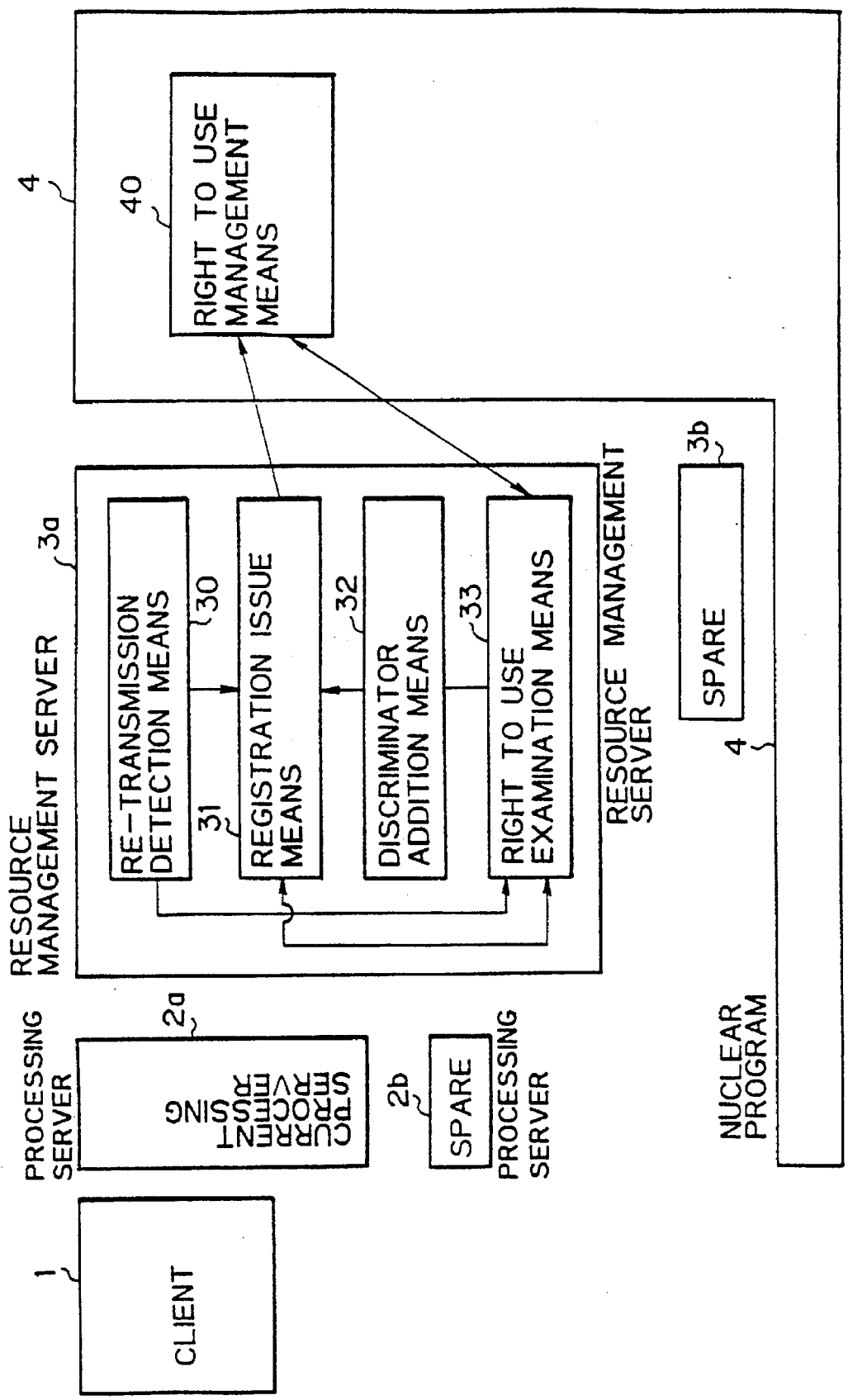

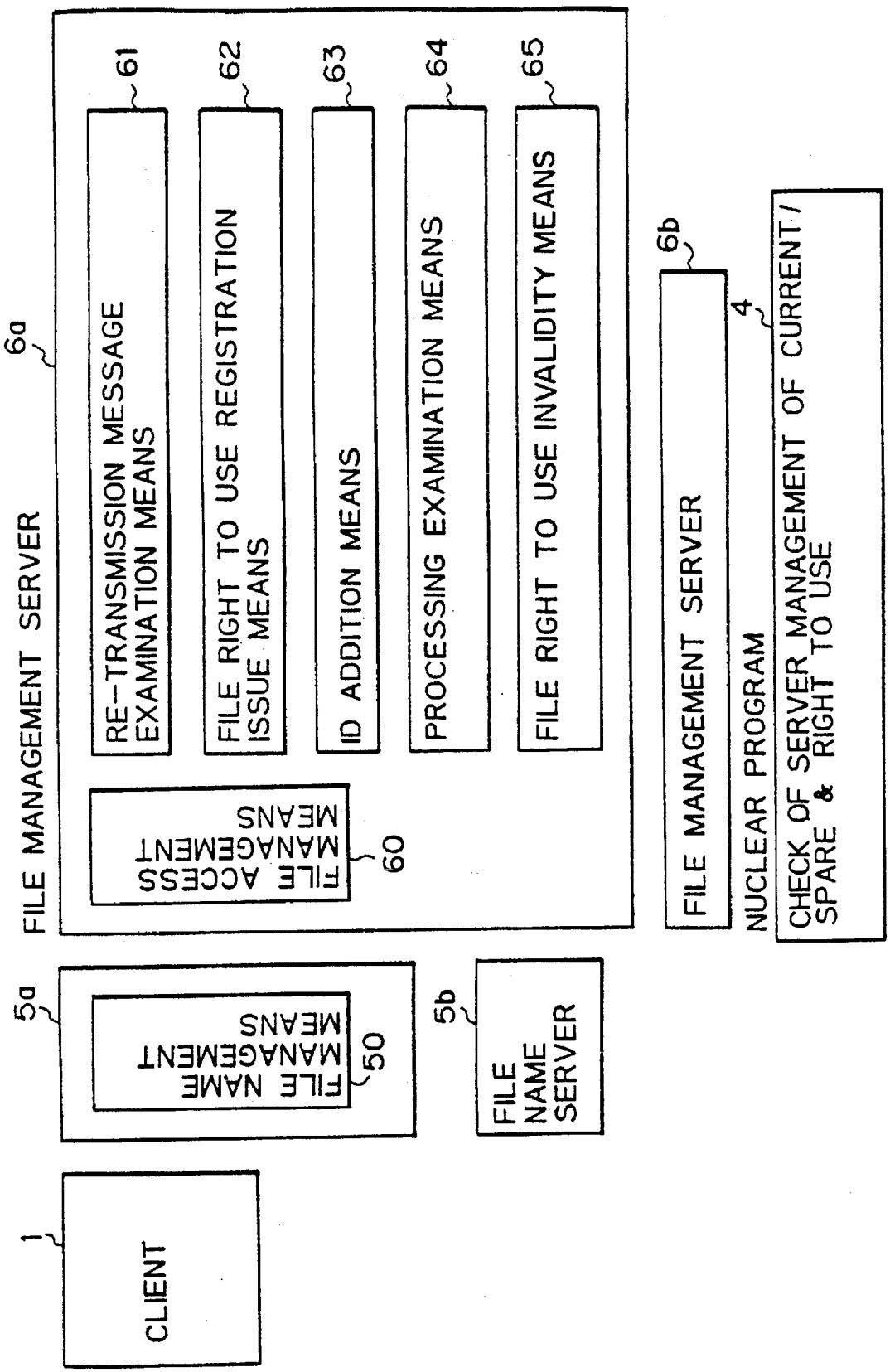

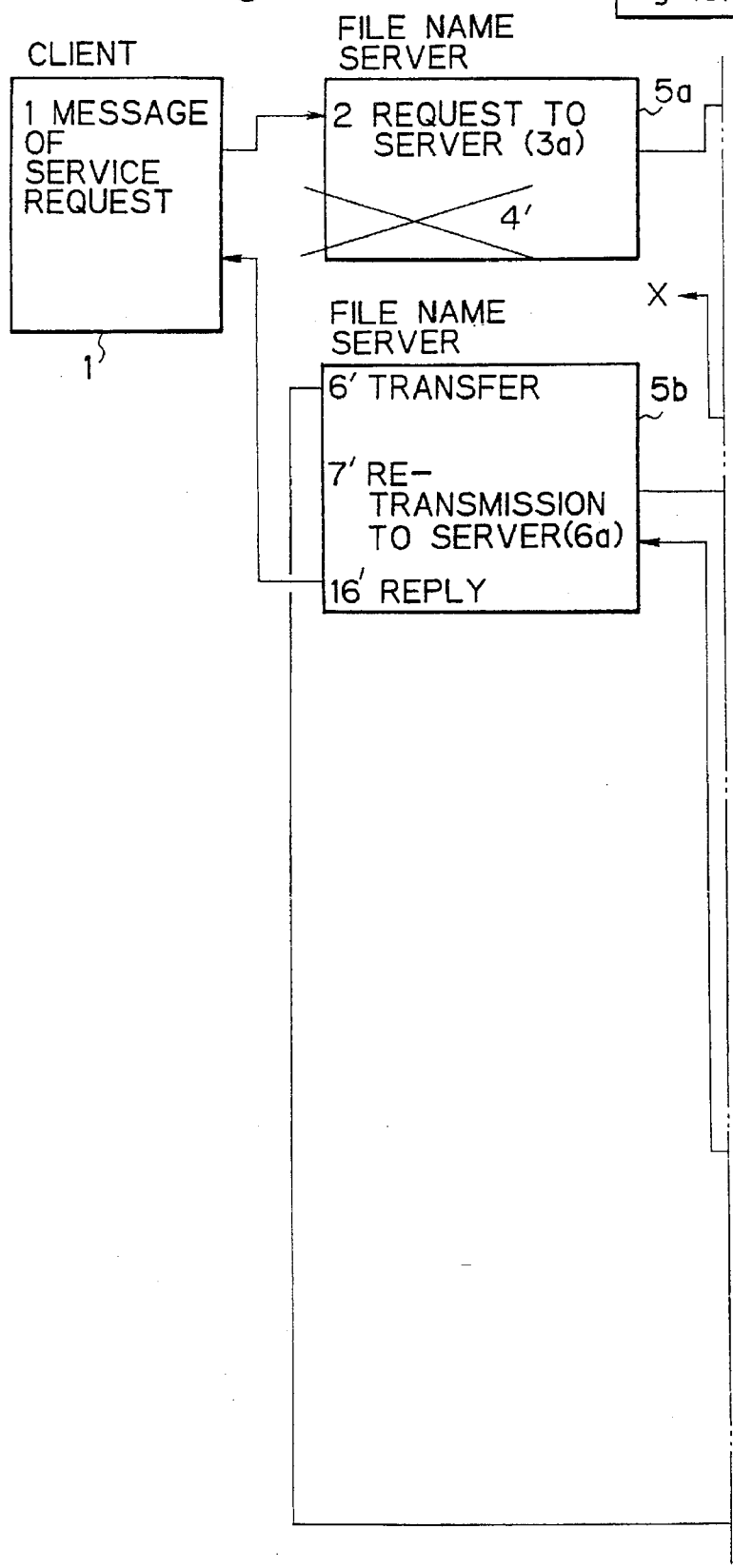

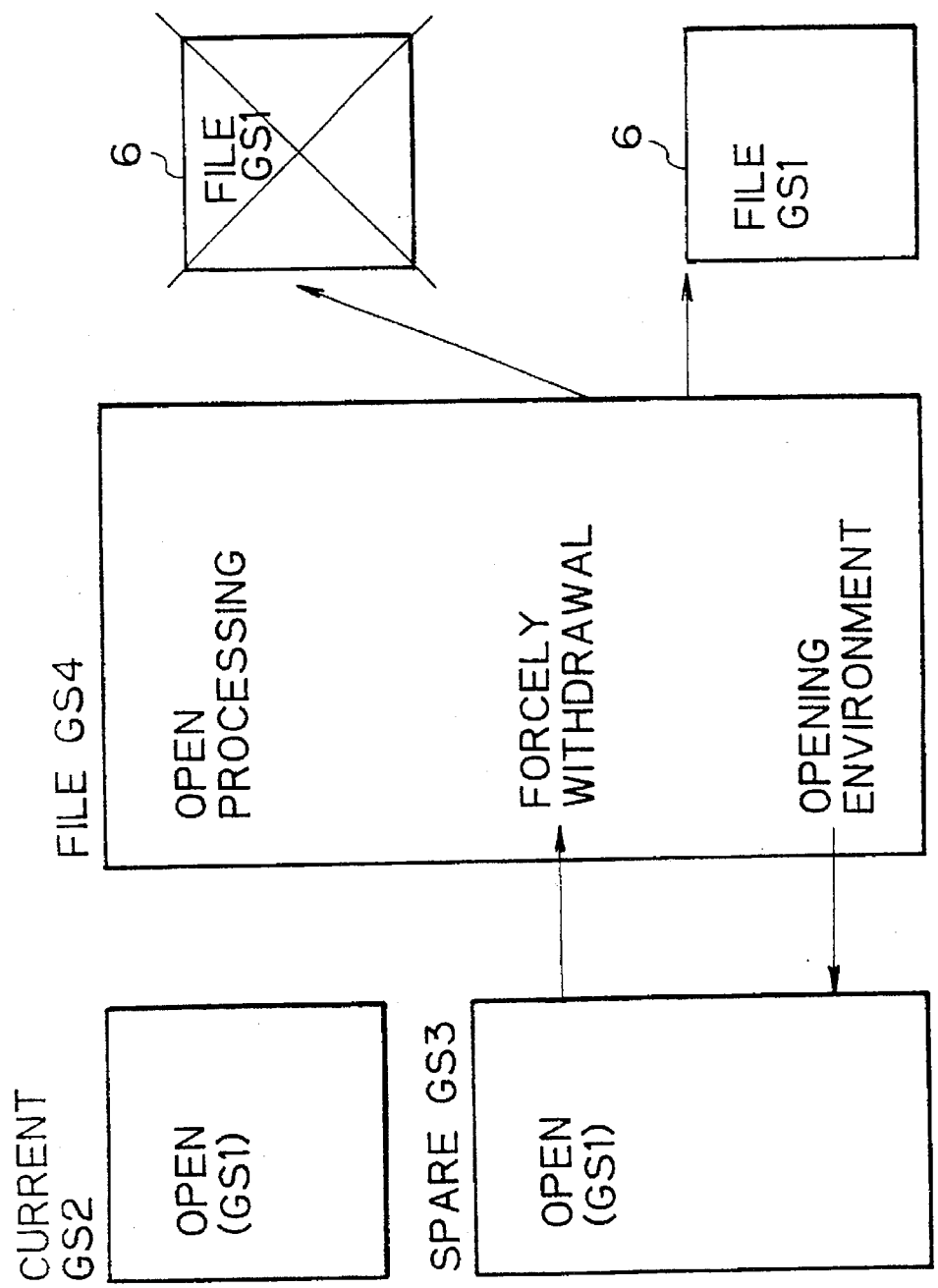

ISSUE PROCESSING SYSTEM AND METHOD FOR A RIGHT TO USE A DATA PROCESSSING SYSTEM RESOURCE

This application is a continuation division of application Ser. No. 07/707,767, filed May 30, 1991, now abandoned.

BACKGROUND OF THE INVENTION

1. Field of the Invention

The present invention relates to an issue processing system for a right to use a resource in a data processing system having a global service program based on a fault-tolerant method. More particularly, it relates to a system for rapidly processing an issue operation of a right to use a resource from a spare processing server to a resource management server in a data processing system employing a fault-tolerant method.

2. Description of the Related Art

In a data processing system, a global service program is provided for controlling all resources in the system, and a predetermined service is provided to an application program with reference to filed information in accordance with a processing of the global service program. In general, the global service program has a current system and a spare system to employ a fault-tolerant method. According to this fault-tolerant method, the application program does not detect the crash of the global service program. In this fault-tolerant method, it is necessary for the spare global service program to rapidly open the file when the crash occurs in the current global program.

That is, in the fault-tolerant method, there are provided a current processing server and a spare processing server in the system to take a countermeasure for an accident (for example, crash of a software in the current server) so that it is possible to continuously offer the service to the client. For example, when the accident occurs in the current processing server, the processing operations are rapidly transferred from the current processing server to the spare processing server.

There are, however, some problems in the system employing the global service program as explained later.

SUMMARY OF THE INVENTION

In accordance with the present invention, there is provided an issue processing system for a right to use a resource in a data processing system having a global service program based on a fault-tolerant method which provides a current processing server and a spare processing server, each processing server performs predetermined data processing function as requested by a client, based on a resource acquired by a current resource management server, and the predetermined data processing is transferred from the current processing server to the spare processing server based on a command of a transfer from a nuclear program when a crash occurs in the current processing server. The resource management server includes:

- a re-transmission examination unit for examining a message from the processing server and determining whether or not it is a re-transmitted message, based on a discriminator 1 or identifier, attached to the message, for requesting acquirement of the right to use the resource;
- a discriminator addition unit for adding the discriminator to the message and for requesting the right to use to be issued, when that right to use is registered; and
- a right to use examination unit for examining the message and determining whether or not it is already registered, based on a previous message for the re-transmission by referencing the discriminator attached by the discriminator addition unit when the message indicates the re-transmission message based on the detection of the re-transmission examination unit.

When the right to use examination unit judges that the right to use is already registered, the above registered right to use is invalidated, and the new right to use is registered into the nuclear program and the new right to use is issued to the processing server.

In a preferred embodiment, a message containing the discriminator transmitted from the processing server to the resource management server is discriminated in accordance with a one-to-one discriminator and a re-transmission number discriminator for counting the number of the re-transmission. The re-transmission examination unit judges whether the message is the re-transmitted message based on the re-transmission count discriminator.

In a preferred embodiment, the one-to-one discriminator is comprised of a multi-discriminator and an issue number counting discriminator, the multi-discriminator being multiplexedly used for the request of acquirement of the same resource, and issue number counting discriminator indicates the number of issues of the multi-discriminator.

In accordance with the other aspect of the present invention, there is provided an issue processing system for a right to use a resource in a data processing system having a global service program based on a fault-tolerant method which provides a current service producing unit and a spare service producing unit, each service producing unit performing a predetermined data processing requested form a data processing unit based on an access processing unit, and the predetermined data processing being transferred from the current service producing unit to the spare service producing unit based on a command of a transfer from a supervisor when a crash occurs in the current service producing means, the system includes:

- a discriminator allocating unit for allocating the same discriminator to the current and spare service producing units; and
- a discriminator informing unit for informing the discriminator allocated by the discriminator allocating unit to the access processing unit for processing a file access when the service producing unit issues the file opening request.

The access processing unit manages the discriminator until the withdrawal of the opening environment is completed, the discriminator being informed from the current service producing unit at the timing of the file opening request therefrom. Further, when the access processing unit manages the same discriminator as that at the time of the file opening request based on the spare service producing unit, the opening environment defined by the discriminator is forcibly withdrawn.

In a preferred embodiment, the discriminator allocating unit allocates the same discriminator to both service producing means when the current and spare service producing means are started.

BRIEF DESCRIPTION OF THE DRAWINGS

In the drawings:

FIG. 3 is a view explaining an issue processing of a right to use;

FIGS. 4 to 7B are views explaining problems in a conventional art;

FIG. 8 is a basic block diagram of an issue processing system according to one aspect of the present invention;

FIG. 10 is a schematic block diagram of an issue processing system according to an embodiment of the present invention;

FIGS. 15A and 15B are a view for explaining the processing operation in the system shown in FIG. 10;

FIG. 21 is a view for explaining the processing operation according to the present invention.

DESCRIPTION OF THE PREFERRED EMBODIMENTS

Before describing the preferred embodiments,a explanation is given of the conventional art and its problems.

Figure 1:
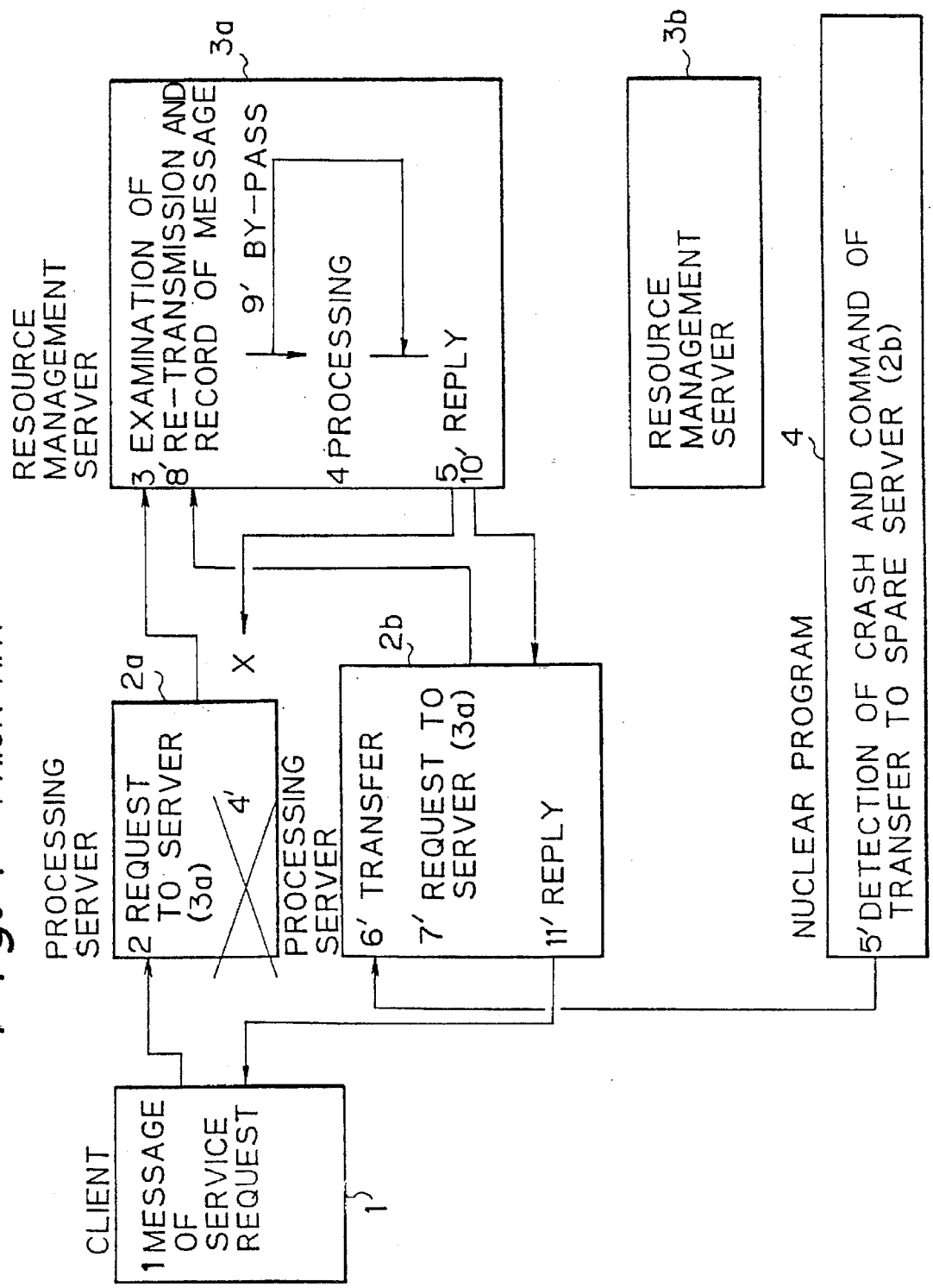
FIG. 1 is a view explaining a fault-tolerant method by using message re-transmission in a conventional art.
Figure 2A:
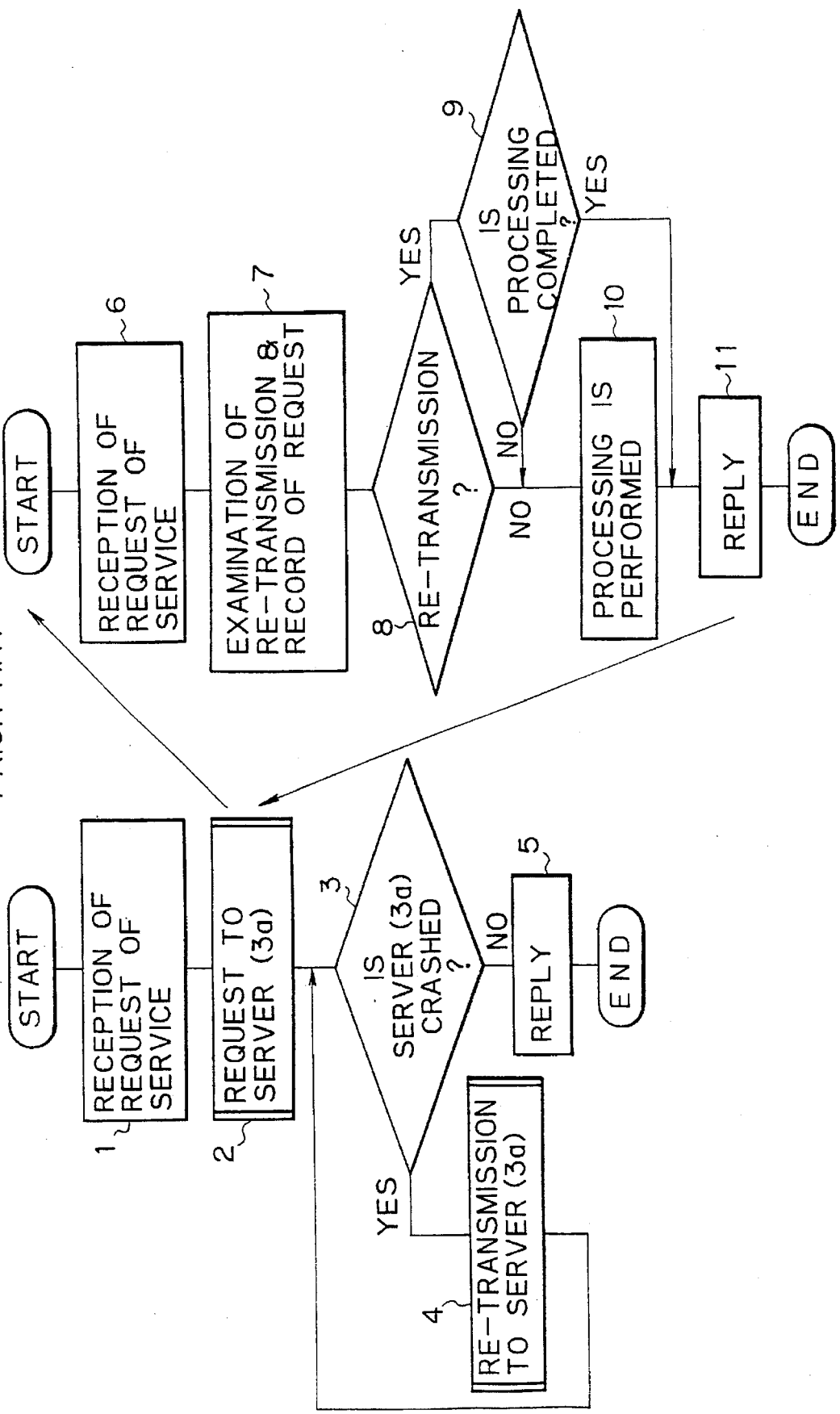
FIGS. 2A and 2B are flowcharts for explaining the operation of the structure shown in FIG. 1.
Figure 2B:
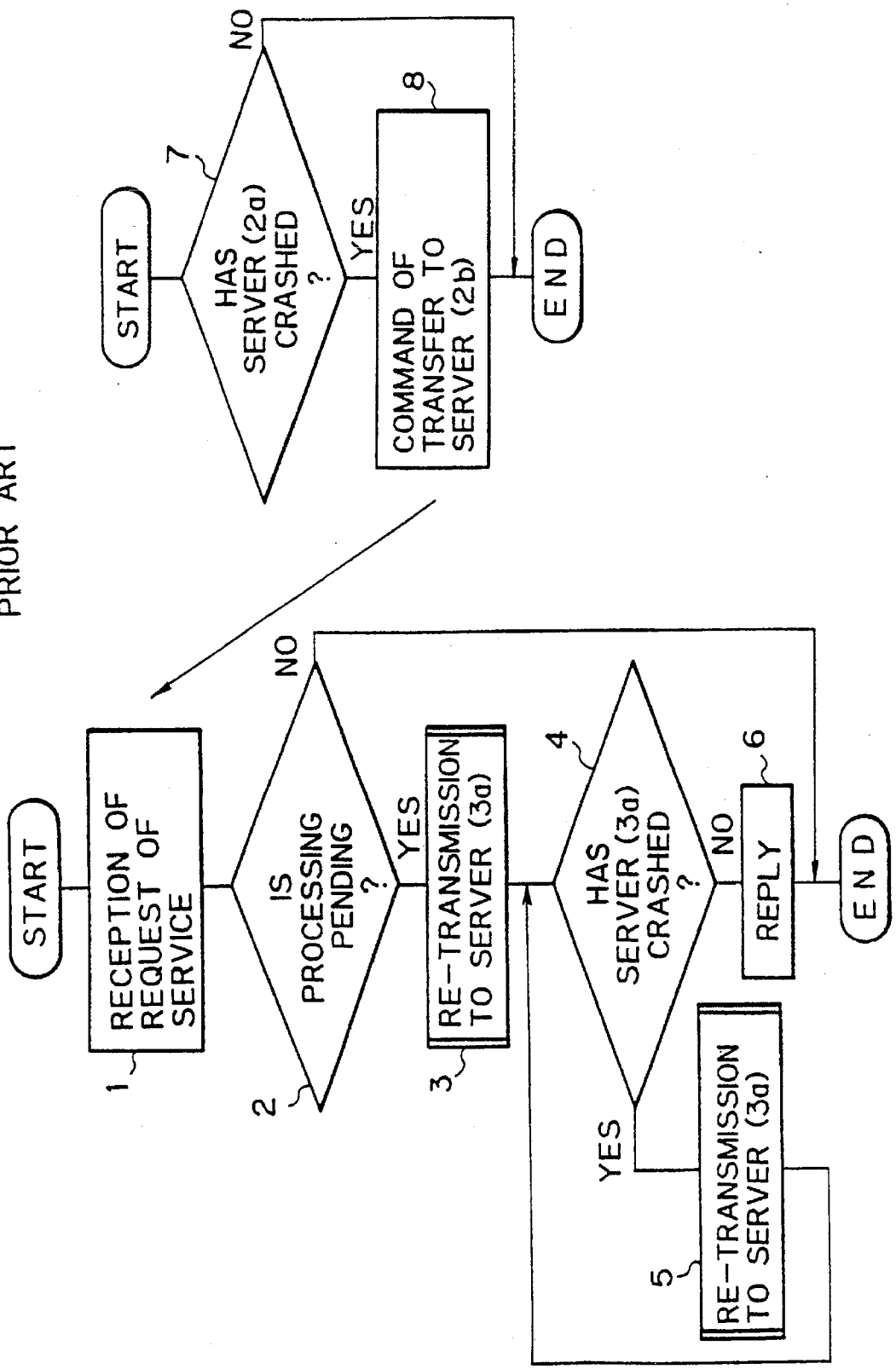

FIG. 1 is a view for explaining a fault-tolerant method by using message re-transmission, and FIGS. 2A and 2B are flowcharts for explaining the operation of the structure shown in FIG. 1.

In FIG. 1, reference number 1 denotes a client, 2a a current processing server 2b a spare processing server 3a a current resource management server, 3b a spare resource management server, and 4a the nuclear program. In this system, the spare processing server 2a and the spare resource management server 3b are used when the accident (for example; crash of a program) occurs in the current system. In general, the client is provided with a means for requesting a predetermined service of the resource management server to utilize the resource, and, in general, the client is comprised of an application program. The resource management server manages the resource in order to provide the service. In this case, the processing server and the resource management server are provided by the global service program.

In a normal processing, when a message for requesting a service is generated from the client 1 (1), the processing server 2a receives the message and requests the service from the resource management server 3a (2). The resource management server 3a receives the request of the service, and examines the message to determine if it is a re-transmitted message (3). Further, in a resource management server 3a, the predetermined processing is performed in accordance with the request of the service, and the resultant data of the processing is replied to the client 1 through the processing server 2a (5). In this case, the resource management server 3a defines the right to use the resource and the above steps are performed based on the right to use.

However, for example, when a crash occurs in the current processing server 2a, the nuclear program 4 detects the crash and commands a transfer of the processing from the current processing server 2a to the spare processing server 2b (5'). When the spare processing server 2b receives the command from the nuclear program 4 (6'), the spare processing server 2b again requests the service to the resource management server 3a (7'). After this, the same steps are performed as explained above (8'→9"→10'→11'). When the processing operation is completed in the re-transmission operation, the processing operation replies through the processing server (10'). Since the processing server and the resource management server are provided by the global service program, and the nuclear program provides commands to the processing server, the global service program provides services using functions provided by the nuclear program.

Further, in the above crash state, the nuclear program 4 sends a message of request to the current resource management server 3a to withdraw the right to use already issued to the crashed processing server 2a. When the resource management server 3a receives this message from the nuclear program 4, the current resource server 3a performs an operation for purging (below, purging operation) the right to use from therein based on the message requested from the nuclear program 4. When the spare processing server 2b receives the command of the transfer from the nuclear program 4, the spare processing server 2b sends the message to the resource management server 3a to acquire the right to use.

FIG. 2A shows the processing operation at the current processing server and the resource management server, and FIG. 2B shows the processing operation at the current server and the nuclear program. In FIG. 2A, when the current processing server 2a receives the message for requesting the service (step 1), the current processing server 2a requests the service from the resource management-server (step 2). The resource management server 3a receives the request of the service (step 6), examines the message to determine whether it is a re-transmitted message and records the request of the message (step 7). When the message is a re-transmission (YES, in step 8), the resource management server 3a judges the request of the service to determine whether it is already processed (step 9). When the request of the service is already processed, (YES, in step 9), the result of processing is replied to the processing server 2a (step 11). When the message is not a re-transmitted message (NO, in step 8), the resource management server performs the request of the service (step 10) and the result of the processing is replied to the processing server 2a (step 11).

Further, the current processing server detects whether the resource management server 3a has crashed (step 3). When it is crashed, the message is re-transmitted from the processing server to the resource management server 3a (step 4). When the resource management server has not crashed (NO, in step 3), the request of the service is imparted to the client 1.

In FIG. 2B, when the current processing server 2a has the processing pending (YES, in step 2), the request of the service is re-transmitted to the resource management server 3a (step 3). Then, the processing server detects whether the resource management server has crashed (step 4). The message is re-transmitted from the processing server to the resource server when it has crashed (step 5). When the resource management server has not crashed, the request of the service is replied to the client (step 6). Further, the nuclear program 4 detects whether or not the current processing server has crashed (step 7), the nuclear program 4 commands and the transfer of the processing to the spare processing server 2b when the current processing server 2a has crashed (step 8).

FIG. 3 is a view for explaining an issue processing of the right to use. As shown in the drawing, the client 1 sends the message for requesting the service to the current processing server 2a (1). When the current processing server 2a receives the message for requesting the service from the client 1, the current processing server 2a sends the message for requesting the issue of the right to use to the current resource management server 3a (2). The current resource management server 3a examines the message to determine whether it is the re-transmission message, and takes the record of the message of the request (3). The current resource management server 3a registers the right to use in accordance with the request from the processing server 2a (4), and performs the processing to be issued. The registration of the right to use is imparted to the current processing server (6), and that processing is replied from the current processing server 2a to the client 1 (7).

When the crash occurs in the current processing server 2a, the nuclear program 4 detects the crash and requests the purging (the purging request) of the right to use already issued to the current resource management server 3a. When the current resource management server 3a receives the purging request, the current resource management server 3a purges the corresponding right to use therefrom.

There are, however, some problems in the above conventional art as explained in detail below. In the fault-tolerant processing system based on the message re-transmission, assuming that the crash occurs in the current processing server 2a, the current resource management server 3a simultaneously receives two requests, i.e., the purging request for the right to use from the nuclear program 4 and the message of re-transmission for requesting the issue of the right to use from the spare processing server 2a. Accordingly, problems occur with the simultaneous reception of two requests as explained in detail hereinafter.

FIGS. 4 to 7 are views for explaining the problems in a conventional art.

Figure 4:
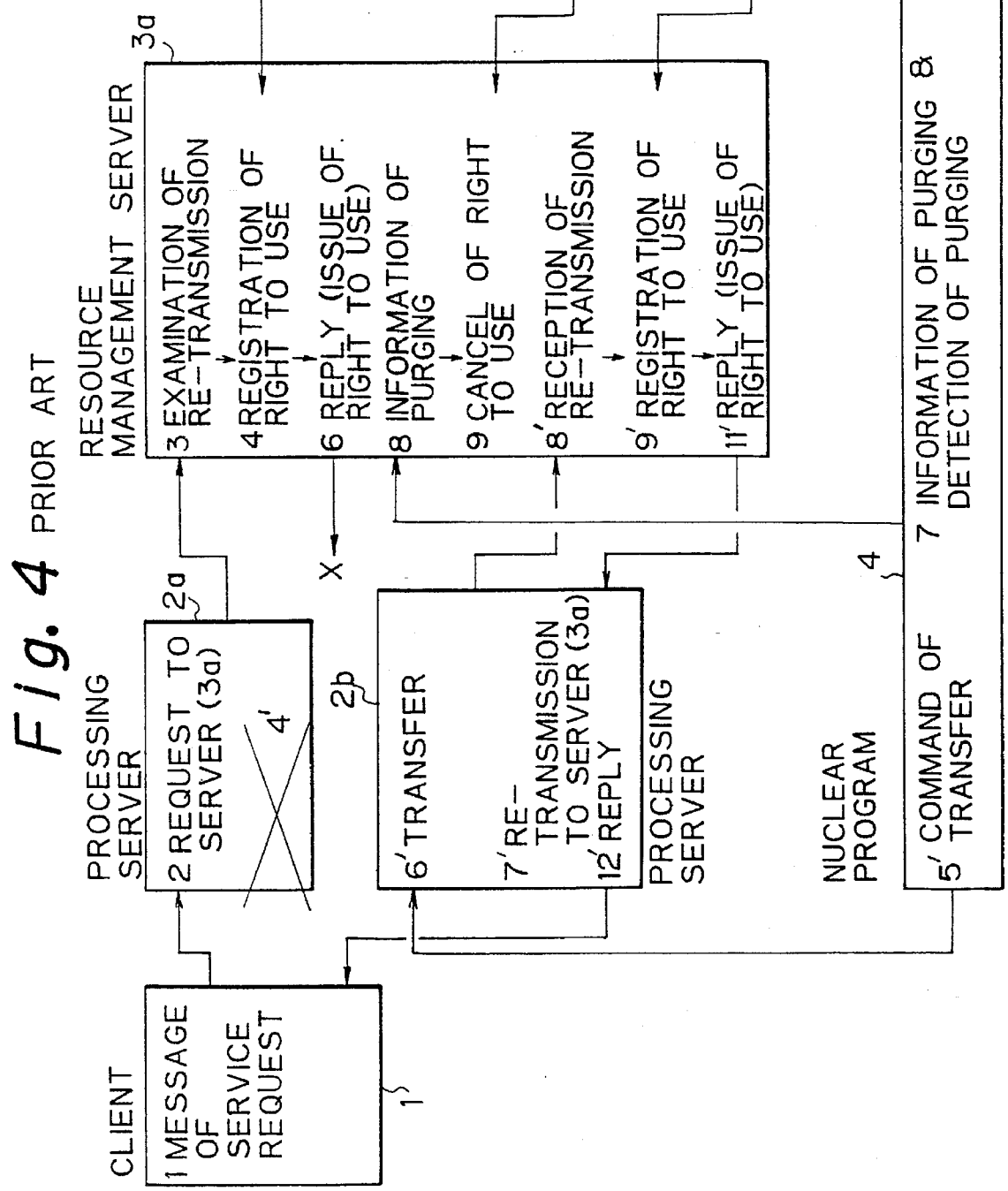

In FIG. 4, when the crash occurs in the current processing server 2a (4'), the nuclear program 4 immediately informs the purging request of the right to use to the current resource management server 3a and detects the corresponding right to use (7, 8) so that the resource management server 3a immediately cancels the corresponding right to use (9). This is because this right to use corresponds to the first request of service from the current processing server 2a, and the corresponding right to use must be cancelled in the current resource management server 3a since the current processing server 2a has crashed.

As shown in the drawing, when the spare processing server 2b transfers the request (6'), it re-transmits the message to the resource management server 3a (7'). In this case, since the right to use is already cancelled before the current resource management server 3a receives the re-transmission of the message from the spare processing server 2b, problems do not occur if these steps occur normally. The new right to use of the re-transmission is registered in the current resource management server 3a (9'), and after registration of the new right to use, the result of the processing is imparted to the spare processing server 2b (11').

Figure 5:
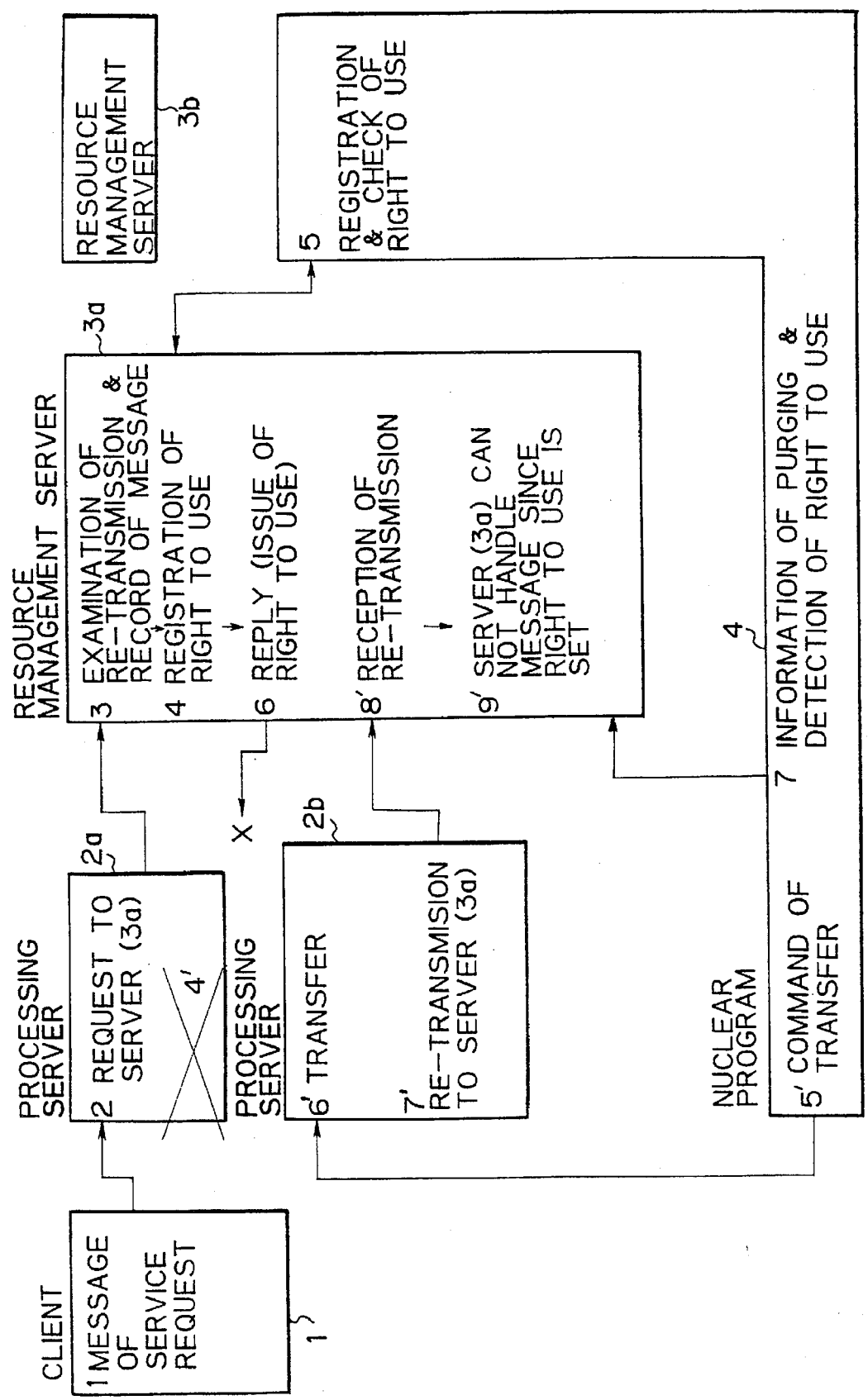

In FIG. 5, as shown in steps 6, 7, and 8', when the crash occurs in the current processing server 2a (4'), the purging request of the right to use from the nuclear program 4 is informed (7) after the current resource management server 3a receives the re-transmission of the message from the spare processing server 2a (8'). Now, a problem occurs in these steps as explained below. That is, at that time, the previous right to use is not cancelled from the current resource management server 3a. Further, the new right to use can not yet be registered in the current resource management server 3a although the current processing server has already crashed. Accordingly, the current resource management server 3a can not issue a new right to use for the spare processing server 2b.

Figure 6:
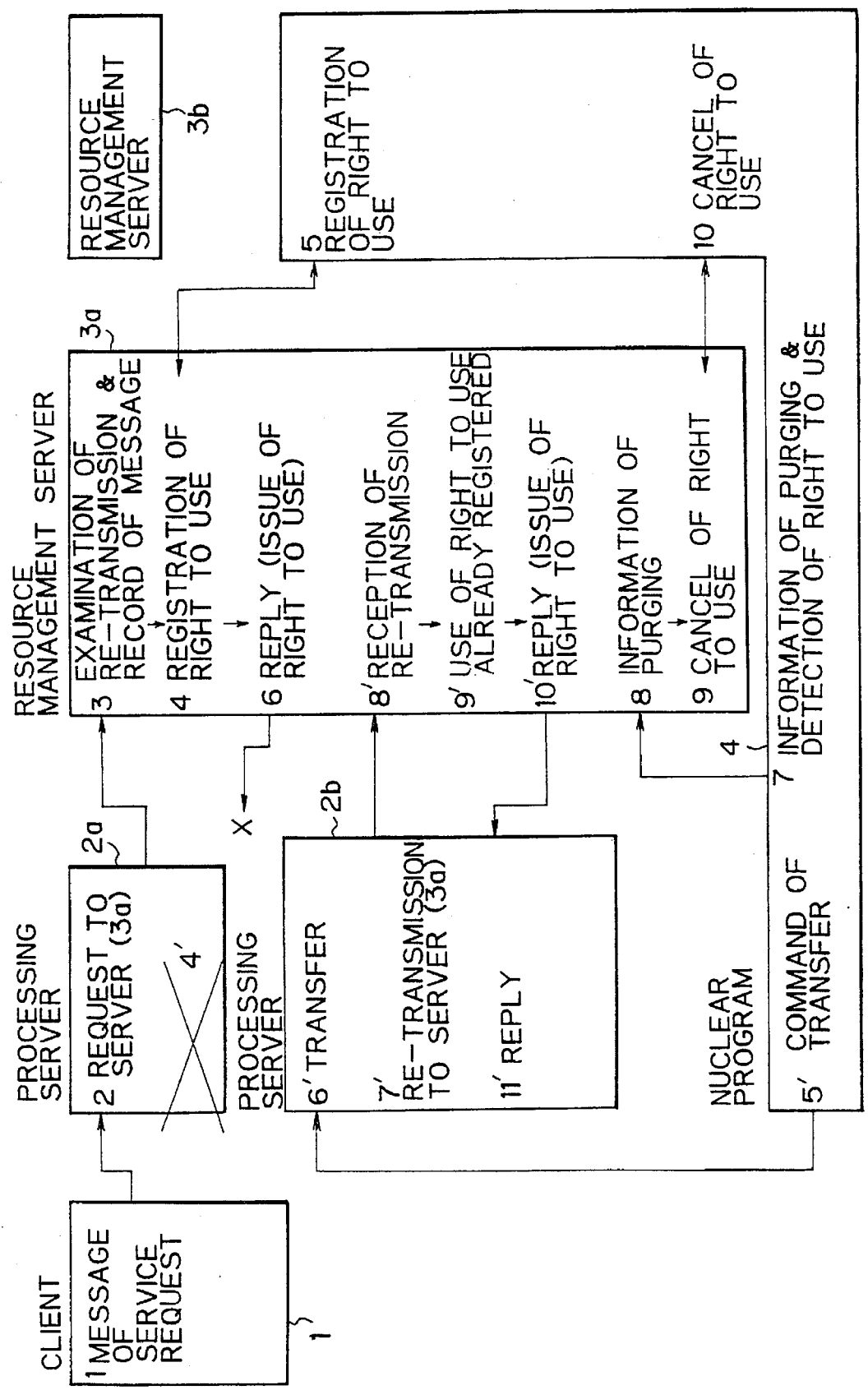

In FIG. 6, as to the steps explained in FIG. 5, when the purging request is belatedly transmitted to the resource management server 3a (8), the new right to use is cancelled based on this purging request (9). That is, if the previous right to use is used for the re-transmission of the message from the spare processing server 2a, this right to use is cancelled by means of the purging request belatedly informed from the nuclear program 4 (9).

Figures 7, 7A:
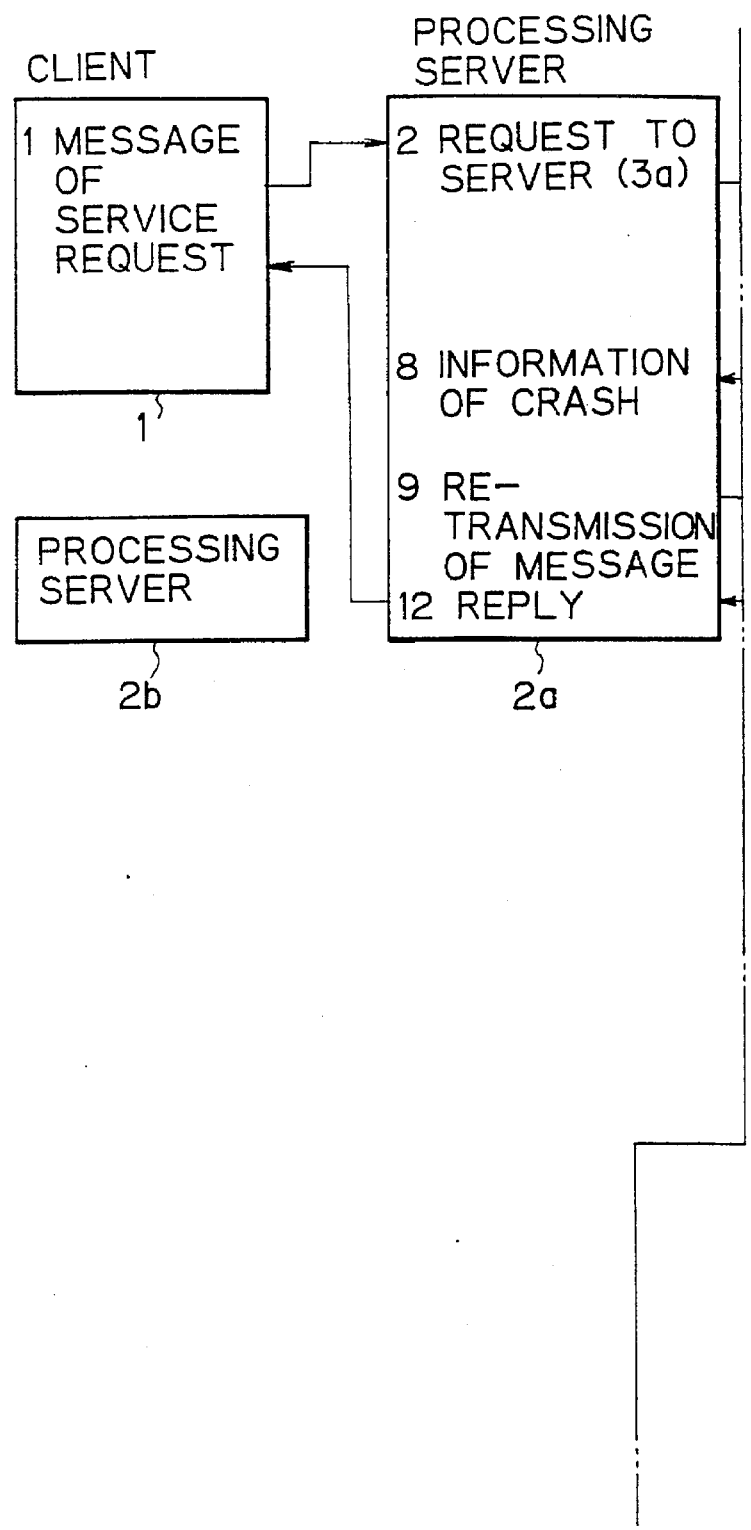

In FIG. 7, when the purging request is belatedly informed from the nuclear program 4 to the resource management server 3a (13), this purging request for the right to use can not be cancelled because it is unclear as to whether it is caused by the crash of the current processing server or it is caused by the client (14). Accordingly, for the spare processing server 2b which received the processing operation from the current processing server, the current resource management server 3a can not use the previous right to use since it is not cancelled.

From the above reasons, in the processing servers 2a, 2b and the resource management servers 3a, 3b which are provided as a global service program, it is difficult to simply utilize these servers as the fault-tolerant method based on the re-transmission of the message.

Accordingly, the primary object of the present invention lies in the rapid re-issue of the right to use for the resource management server when the crash occurs in the current processing server.

FIG. 8 is basic block diagram of an issue processing system according to one aspect of the present invention. The same reference numbers used in FIG. 1 are attached to the components in this drawing. As explained above, the client 1 sends a message for requesting a service to the processing server. The processing server 2a is provided as a current server. The current processing server 2a requests the service to the resource management server, and imparts the resulting processing, which is performed in the resource management server, to the client 1. The processing server 2b is provided as a spare processing server. When the crash occurs in the current processing server 2a, the processing operation is transferred from the current processing server 2a to the spare processing server 2b.

The resource management server 3a is provided as a current management server. The resource management server 3a acquires the right to use from the nuclear program 4 in accordance with the request of the service and issues a corresponding right to use to the current processing server 2a. The resource management server 3b is provided a spare management server. The resource management server 3a has a re-transmission detection means 30, a registration issue means 31, a discriminator addition means 32, and a right to use examination means 33. These means are explained in detail below. The nuclear program 4 is provided for checking the operation of the processing servers and for managing (for example, registering, cancelling, checking, etc.) the right to use. Accordingly, the nuclear program 4 has management means 40 for the right to use the resource.

The re-transmission detection means 30 examines the message to determine whether it is a re-transmitted message in accordance with a discriminator attached to the message. In this case, the message is transmitted from the current processing server 2a and includes the request for acquiring the resource. The registration issue means 31 acquires the right to use in response to the message, registers the acquired right to use in the management means 40, and issues the right to use to the current processing server 2a. Further, the registration issue means 31 cancels the registered right to use in accordance with the information from the processing server 2a and the nuclear program 4. The discriminator addition means 32 attaches the discriminator of the message to the right to use when the registration issue means 31 registers the right to use into the management means 40. The right to use examination means 33 examines the right to use to determine whether it is already issued and registered in accordance with the message of the re-transmission. This examination is performed with reference to the discriminator in the management means 40 at the time when the re-transmission detection means 30 detects that the message is a re-transmitted one.

Figure 9A:
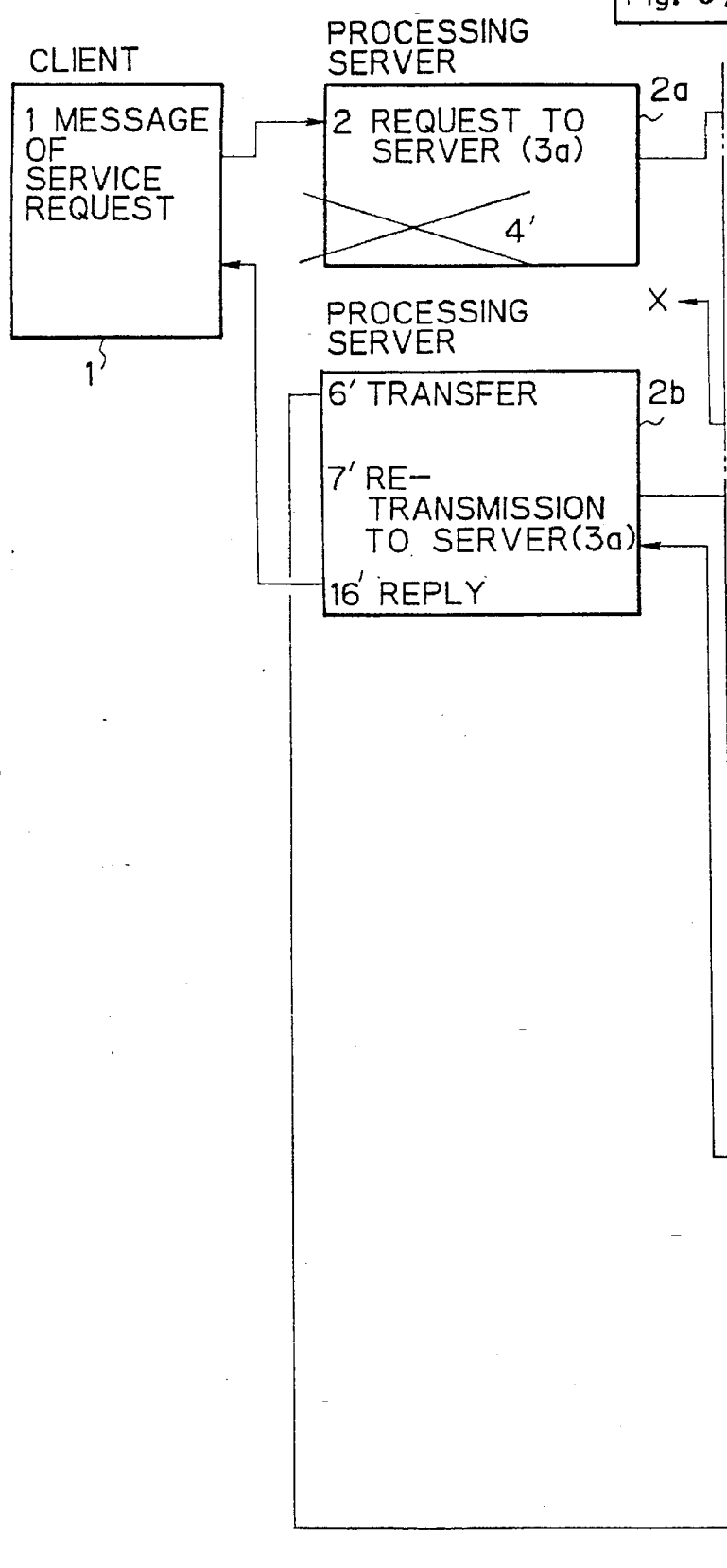
FIGS. 9A and 9B are a view for explaining processing steps of the structure shown in FIG. 8.
Figure 9B:
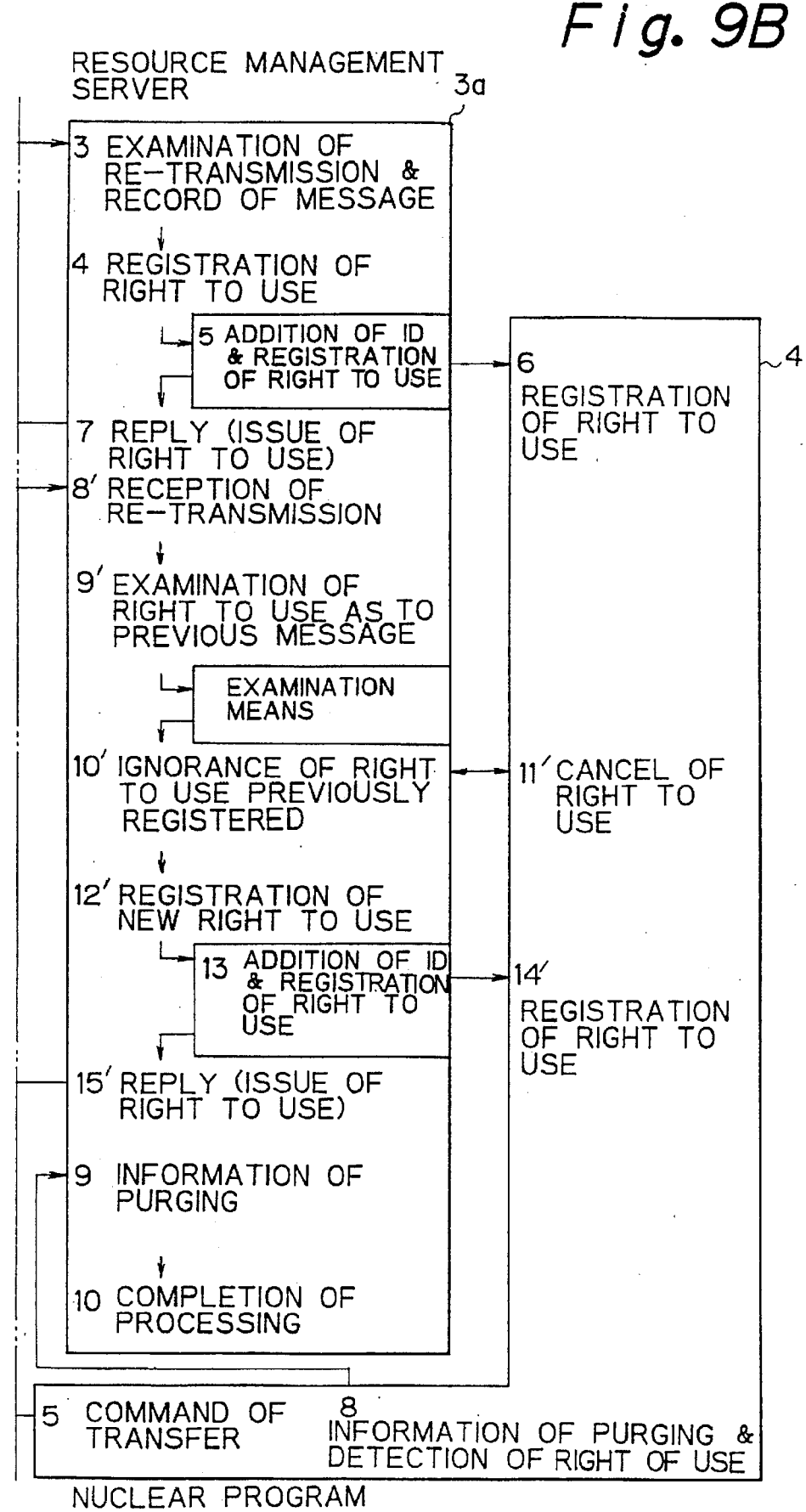

FIGS. 9A and 9B are a view for explaining the processing steps of the structure shown in FIG. 8. As explained above, when the resource management server 3a judges that the message of the request for acquiring the resource from the current processing server 2a is not the re-transmitted message in accordance with the processing at the re-transmission detection means 30, the resource management server 3a acquires the requested right to use. The resource management server 3a registers the acquired right to use into the right to use management means 40, and issues that acquired right to use to the current processing server 2a. Further, the resource management server 3a adds the discriminator corresponding to the issued message to the right to use to be registered.

When the resource management server 3a judges that the message of the request is the re-transmitted message in accordance with the processing at the re-transmission detection means 30, the resource management server 3a judges whether the corresponding right to use is registered and issued in accordance with the processing at the right to use examination means 33. When the right to use is already registered and issued, the resource management server 3a ignores the previous right to use in accordance with the processing at the registration issue means 31, and registers a new right to use after addition of the discriminator, then issues a new right to use to the spare processing server 2b.

In this case, when the right to use is not yet registered and issued there are two causes in the crash, i.e., the crash of the resource management server itself or the crash of the current processing server itself. Accordingly, the resource management server 3a again registers the right to use after the addition of the discriminator and issues a new right to use to the spare processing server 2b.

As shown in FIG. 9, in the resource management server 3a, when the right to use is registered (4), the ID is added to the right to use (5), and, after the addition of the ID, the right to use is registered into the nuclear program 4 (6). The issue of the right to use and the result of the processing are imparted to the current processing server (7). When the crash occurs in the current processing server (4'), the processing operations transferred to the spare processing server (6') and re-transmits the request to the resource management server (7'). When the resource management server 3a receives the re-transmission of the message (8'), it examines the message and determines whether it is a re-transmitted message (9'). When the message is re-transmitted, the previously registered message is ignored (10') and a new right to use is registered (12'). Then the ID is added to the new right to use (13') and this right to use is registered into the nuclear program 4 (14').

FIG. 10 is a schematic block diagram of an issue processing system according to an embodiment of the present invention. In FIG. 10, reference numbers 5a and 5b denote file name servers, and 6a and 6b denote file management servers. In this case, 5a and 6a are used as current systems, and 5b and 6b are used as spare systems. The file name server 5a has a file name management means 50. The file management server 6a has a file access management means 60, a re-transmission message examination means 61, a file right to use registration/issue means 62, an ID addition means 63, a processing examination means 64, and a file right to use invalidation means 65.

The client 1 issues the request for opening a file (below, file opening request) to the file name server 5a. The file name server 5a defines one of file management servers 6a and issues a file opening request to the defined file management server 6a. Accordingly, the file name management means 50 is provided for managing the relationship between the file name and its location.

In the file management server 6a, the file access management means 60 is provided for performing an access processing to the file. The re-transmission message detection means 61 is provided for judging whether the message of the file opening request is a re-transmitted message based on the discriminator attached to the message. The file right to use registration/issue means 62 is provided for performing the registration, the issue, and the cancellation of the right to use. The ID addition means 63 is provided for adding the discriminator to the message of the right to use of the file when the right to use the file is registered. The processing examination means 64 is provided for judging whether the right to use file is issued and registered. The file right to use invalidity means 65 is provided for making the right to use of the file invalid.

Figure 11:
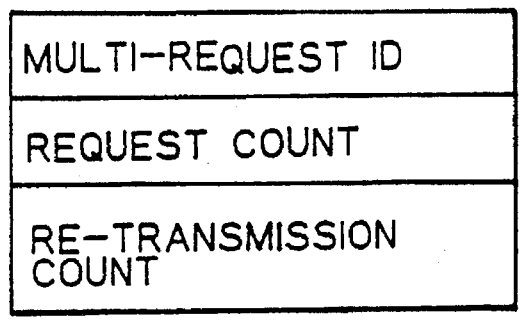
FIG. 11 is one example of a discriminator according to the present invention.

FIG. 11 is one example of a discriminator according to the present inventions. A multi-request ID is used for requesting the opening of the file. A request count is used for displaying the request number at the multi-request-ID. A re-transmission count is used for counting the number of the re-transmission of the same file opening request. Accordingly, the re-transmission message detection means 61 detects the re-transmission message when the number of the re-transmission count is indiscriminate.

Figure 12A:
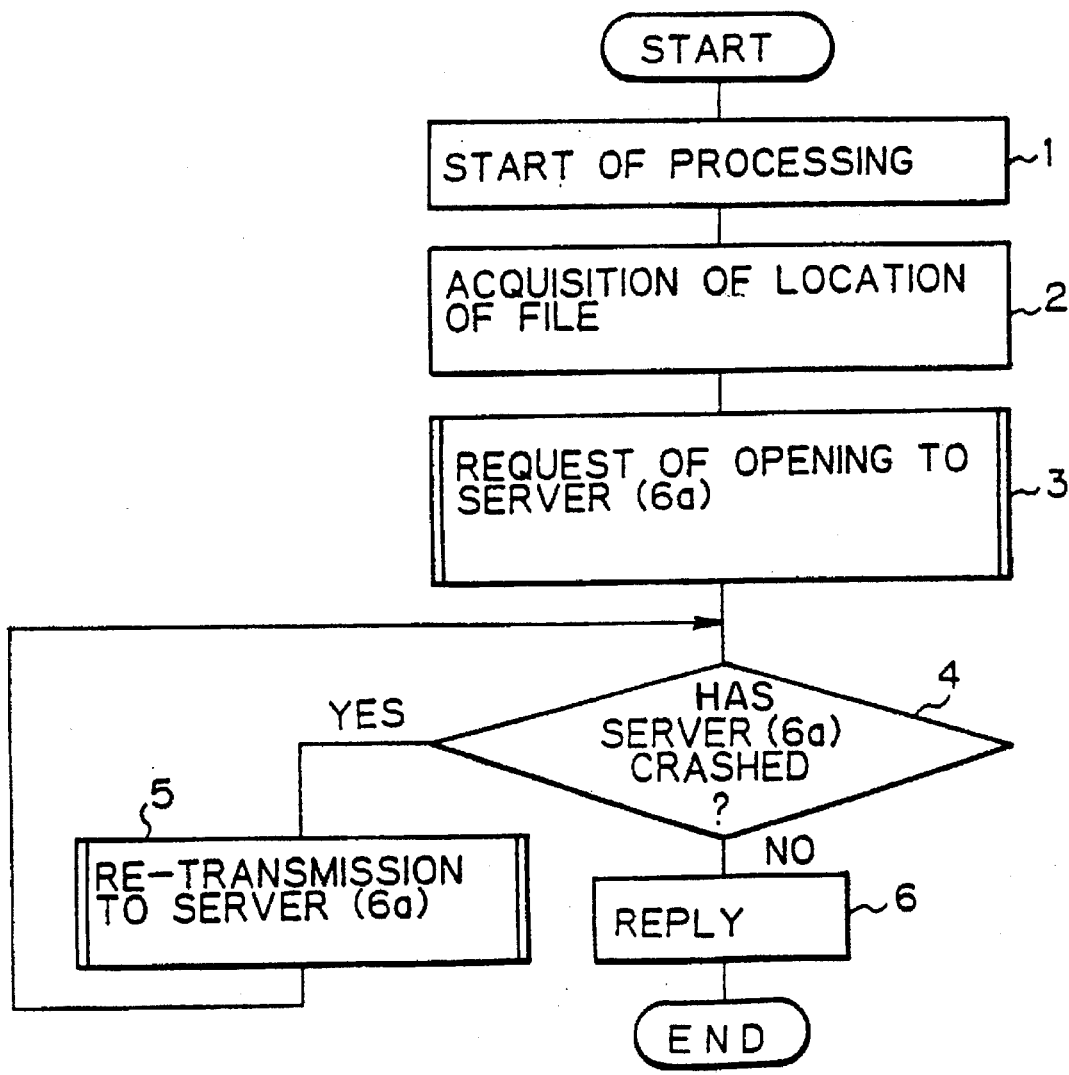
FIGS. 12A and 12B are flowcharts for explaining the processing in a file name server.
Figure 12B:
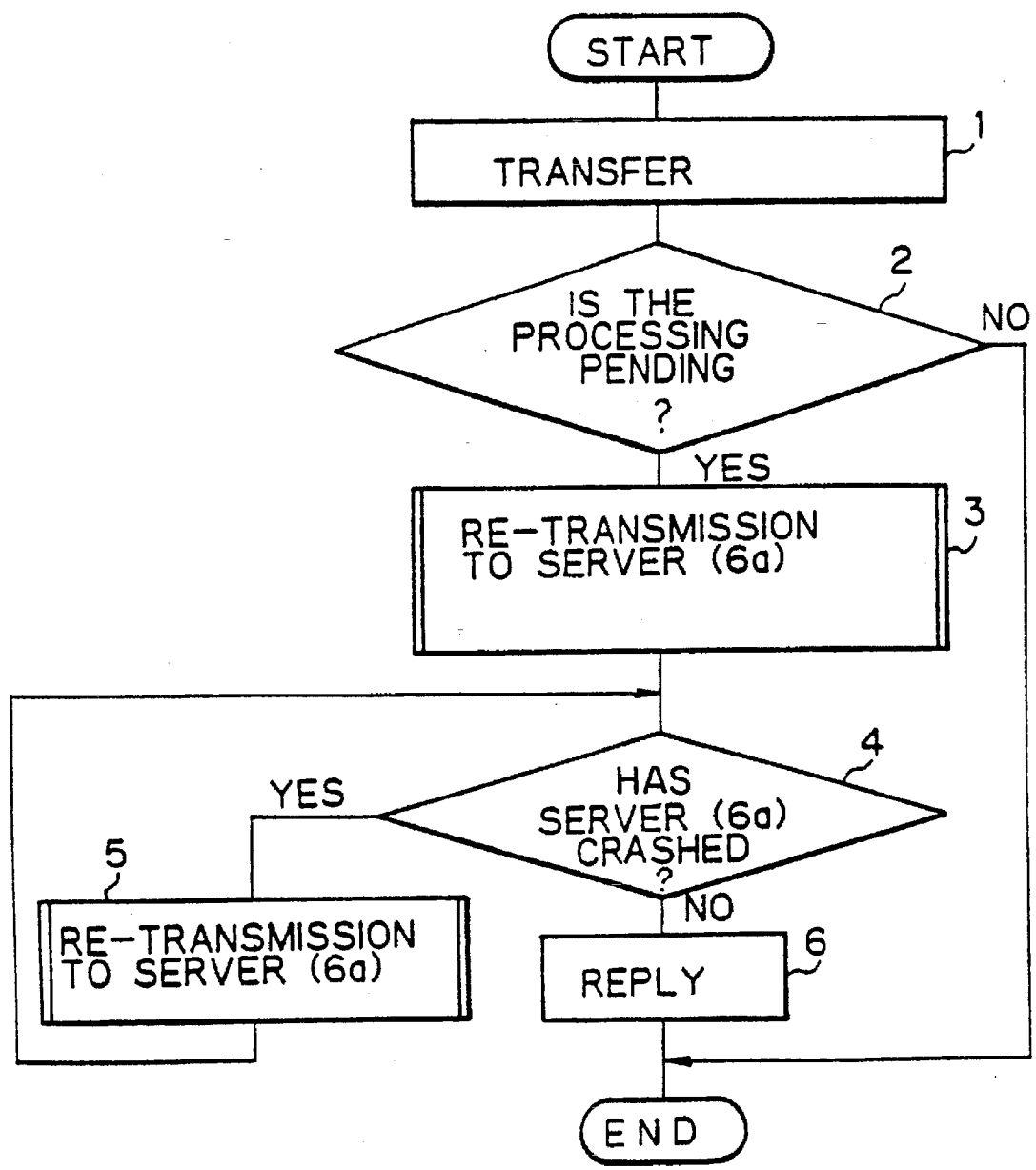
Figure 13B:
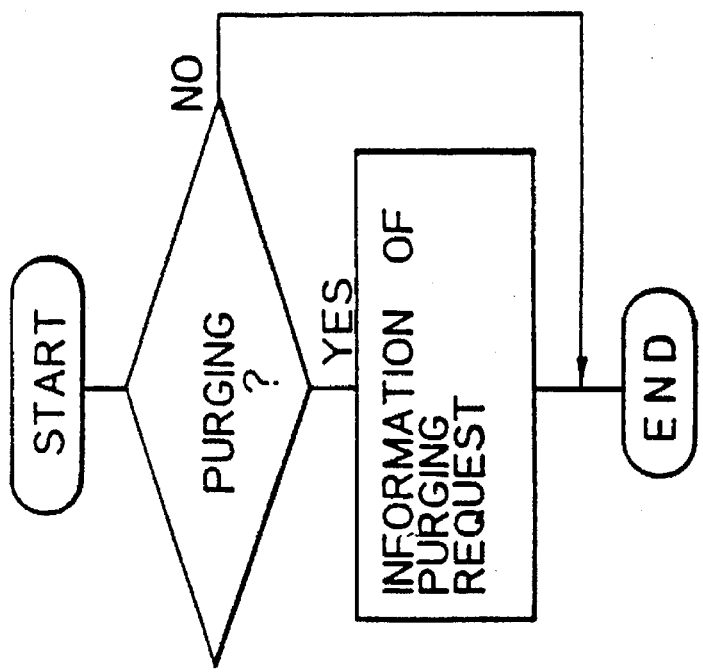
FIGS. 13A and 13B are flowcharts for explaining the processing in a nuclear program.
Figure 13A:
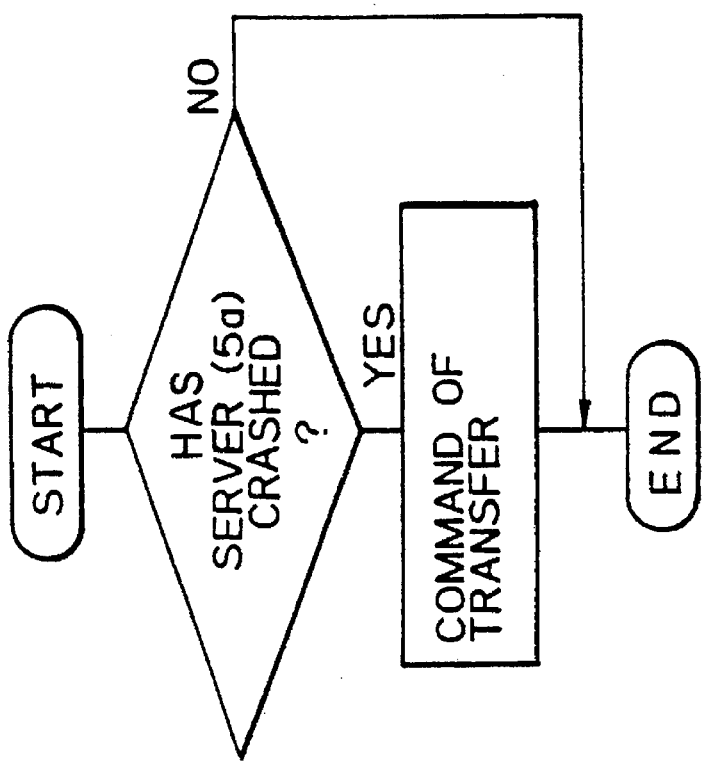
Figure 14A:
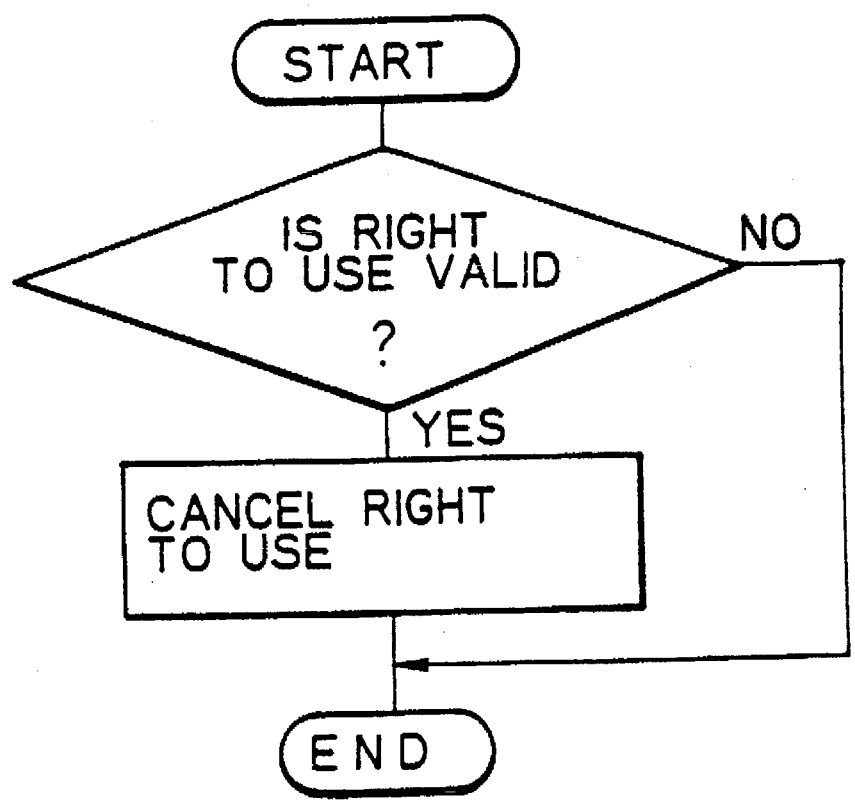
FIGS. 14A and 14B are flowcharts for explaining the processing in a file management server.
Figure 14B:
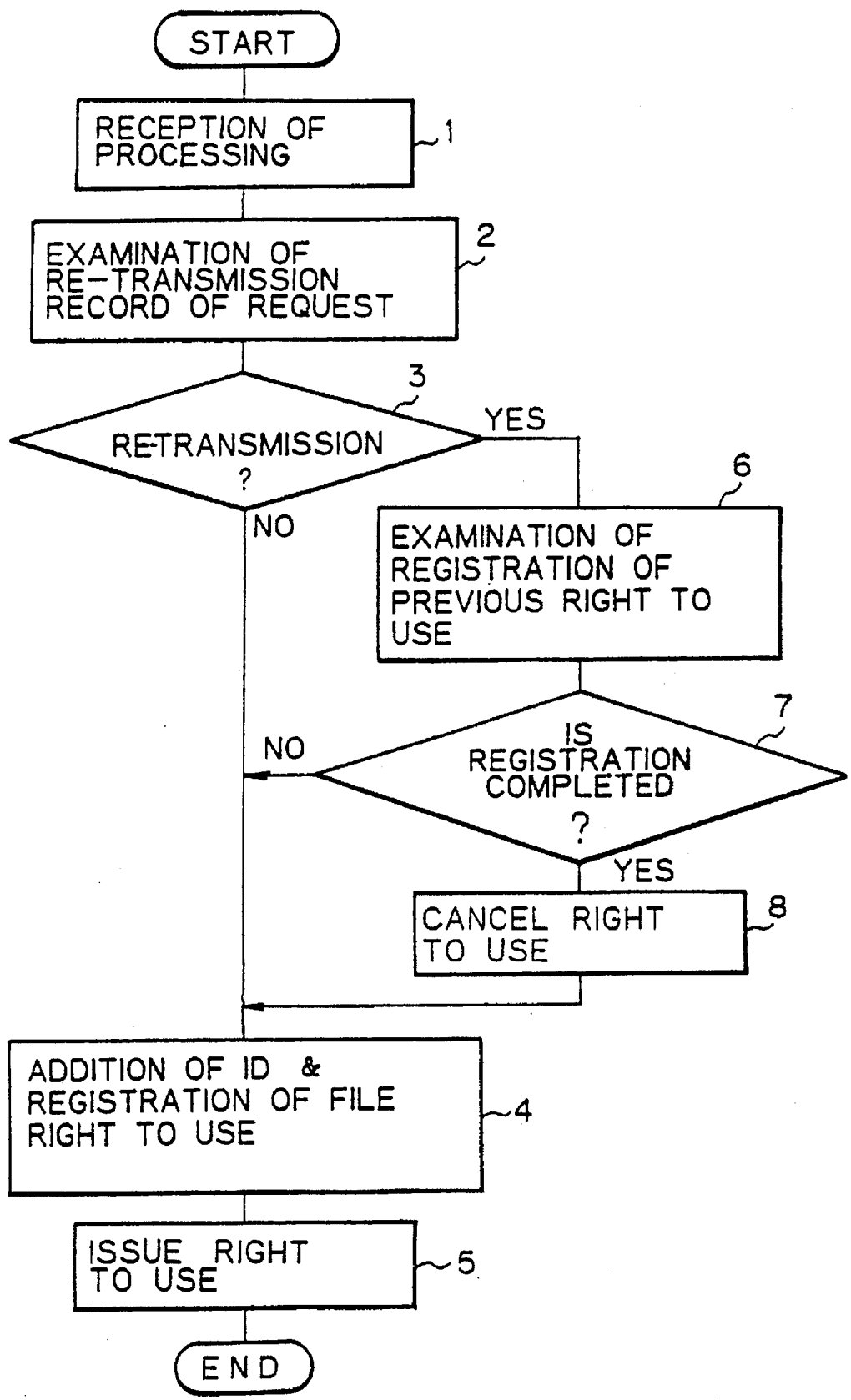

FIGS. 12A to 14B are flowcharts for explaining the processing of the present invention. FIGS. 12A and 12B are flowcharts for explaining the processing in the file name server, FIGS. 13A and 13B are flowcharts for explaining the processing in the nuclear program, and FIGS. 14A and 14B are flowcharts for explaining the processing in the file management server.

In FIG. 12A, the current file name server 5a receives the message of the file opening request from the client (step 1), refers to the file name management means 50 therein, acquires the file management server 6a managing the corresponding file with which the file opening request exists (step 2), and sends the message of the file opening request to the corresponding file management server 6a (step 3). Next, when the corresponding file management server 6a crashes (YES, in step 4), the message of the file opening request is re-transmitted from the file name server 5a (step 5). When the corresponding file management server 6a does not crash (NOI, in step 4), the processing at the file management server 6a is replied to the file name server 5a after registration of the file right to use in the file management server 6a (step 6).

In FIG. 12B, the spare file name server 5b receives the command of the transfer of the processing from the nuclear program 4 (step 1), detects whether the processing is pending (step 2), when the processing is pending therein (YES, step 2), the message of the file opening request is re-transmitted from the spare file name server 5b to the corresponding file management server 6a (step 3). Next, when the corresponding file management server 6a crashes (step 4, YES), the message of the file opening request is re-transmitted from the spare file name server 5b (step 5). When the corresponding file management server 6a does not crash (step 4, NO), the processing at the file management server 6a is replied to the spare file name server 5b after registration of the file right to use in the file management server 6a (step 6).

In FIG. 13A, the nuclear program 4 always checks whether the operation of the current file name server 5a has crashed (step 1). When the current file name server 5a crashes (YES, step 1), the nuclear program 4 commands the transfer of the processing to the spare file name server 5b.

In FIG. 13B, the nuclear program 4 checks whether the right to use the file management server 6a should be purged (step 1). When the crashed current file name server 5a has the right to use, the nuclear program 4 sends the purging request to the file management server 6a so as to purge the corresponding right to use (step 2).

In FIG. 14A, when the file management server 6a receives the purging request of the file right to use from the nuclear program 4, the file management server 6a judges whether the corresponding file right to use is valid (step 1). When the corresponding file right to use is valid (YES, step 1), it is cancelled from the file management server 6a based on the command of the nuclear program 4 (step 2).

In FIG. 14B, when the file management server 6a receives the message of the file opening request from the file name server 5a (step 1), the file management server 6a checks the value of the re-transmission counter of the discriminator attached to the message, examines whether the message is a re-transmitted message, and records the result of the examination to transfer the processing to the spare file management server 6b (step 2). Next, based on the result of the examination, when the message is not re-transmitted (NO, in step 3), the file management server 6a attaches the discriminator to the corresponding file right to use and registers the file right to use into a memory area of the nuclear program 4 (step 4). In this case, the file right to use is registered with the discriminator. After the above steps, the registered file right to use is transmitted to the file name server 5a to which the file opening request is issued (step 5).

When the message is a re-transmission (YES, in step 3), the file management server 6a examines whether the file right to use is already registered in accordance with the previous message of the file opening request (step 6). When the file right to use is not registered therein (NO, in step 7), the addition of the ID and registration of the right to use are performed (step 4). When the file right to use is already registered therein (YES, step 7), the corresponding file right to use is cancelled (step 8), and the addition of the ID and registration of the right to use are performed (step 4).

Figure 15B:
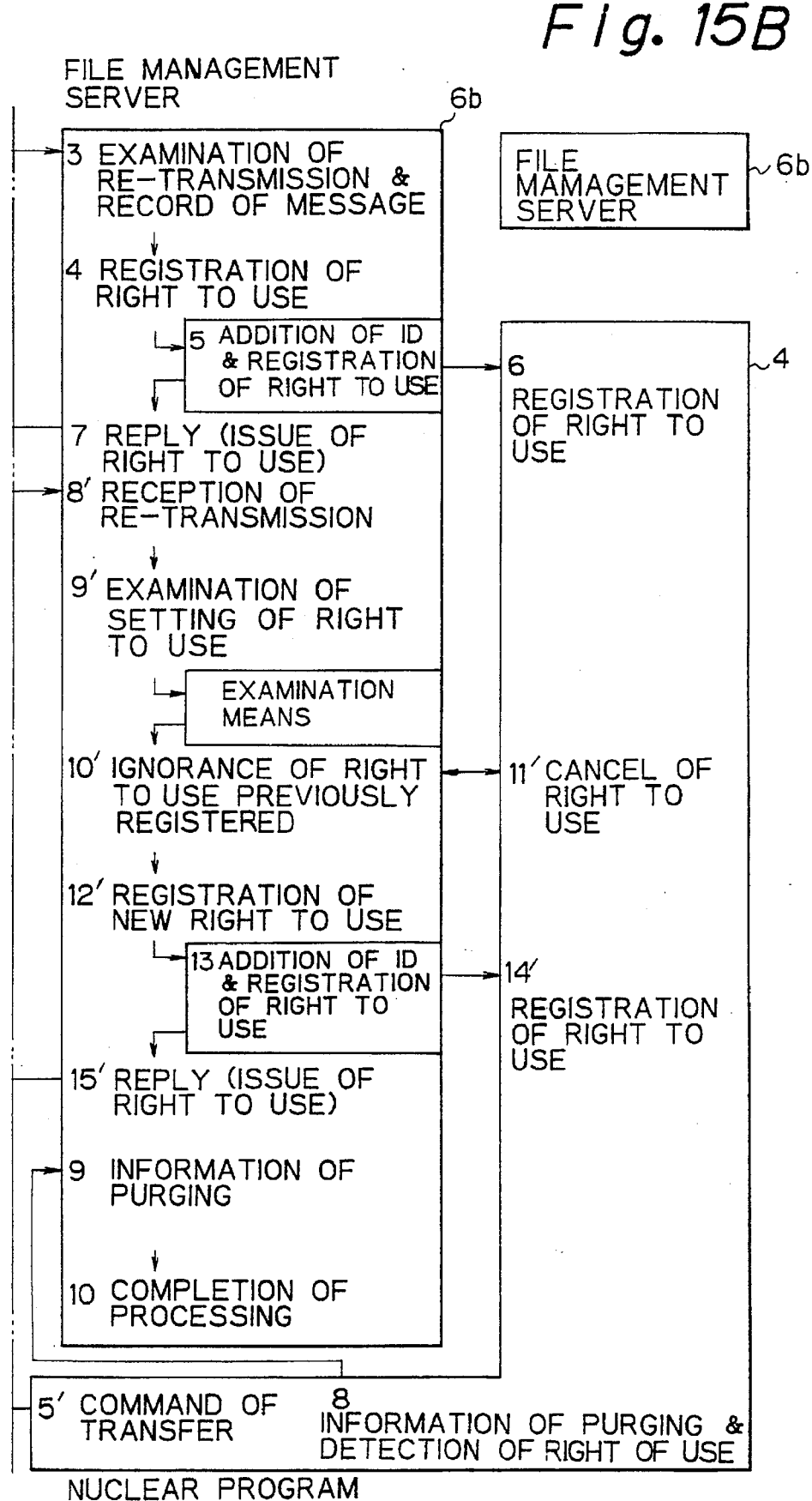
Figure 16:
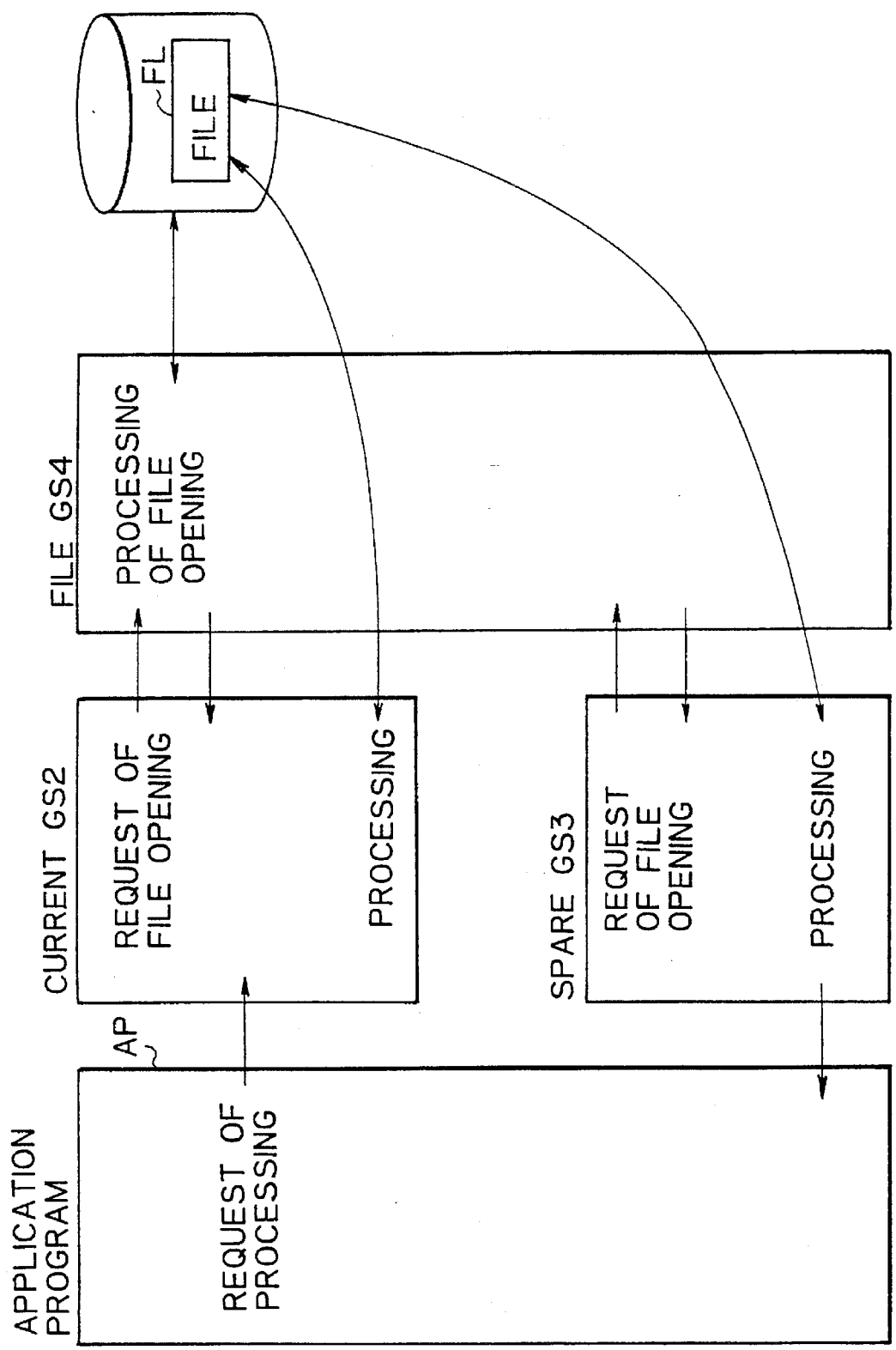
FIG. 16 is a schematic block diagram of a data processing system having a global service program based on a fault-tolerance method.

FIGS. 15A and 15B are a view for explaining the processing operation in the system shown in FIG. 10. Each step of this drawing is already explained in the previous drawings. Accordingly, the detailed explanations are omitted in this stage. Briefly, the file management server according to the present invention can rapidly issue the file right to use to the spare file name server 5b even if the file management server 6a receives the request of the file right to use from the spare file name server 5b before the reception of the purging request from the nuclear program FIG. 16 is a schematic block diagram of a data processing system having a global service program based on a fault-tolerant method. In FIG. 16, AP denotes a application program, GS2 denotes a global service program used as a current system, GS3 denotes a global service program used as a spare system, GS4 denotes a file global service program, FL denotes a file provided in an external storage device.

As explained above, in a data processing system, a global service program is provided for controlling all resources in the system, and a predetermined service is provided to an application program with reference to filed information in accordance with processing of the global service program. In general, the global service program has a current system and a spare system to perform a fault-tolerant method. According to this fault-tolerant method, the application program does not detect the crash of the global service program. In this fault-tolerant method, it is necessary for the spare global service program to rapidly open the file when the crash occurs in the current global program.

As shown in the drawing, in a normal processing operation, when the predetermined processing is requested from the application program AP to the global service program, the current GS2 transmits a file opening request to the file GS4. The file GS4 performs a file opening processing so that the file FL is opened by the file GS4. Accordingly, the current GS2 can process the request from the application program.

When the crash occurs in the current GS2, the processing request from the application program is transferred from the current GS2 to the spare GS3, and the spare GS3 transmits the file opening request to the file GS3 so that the spare GS3 can process the request from the application program. Accordingly, the application program does not detect the crash of the global service program.

Figure 17:
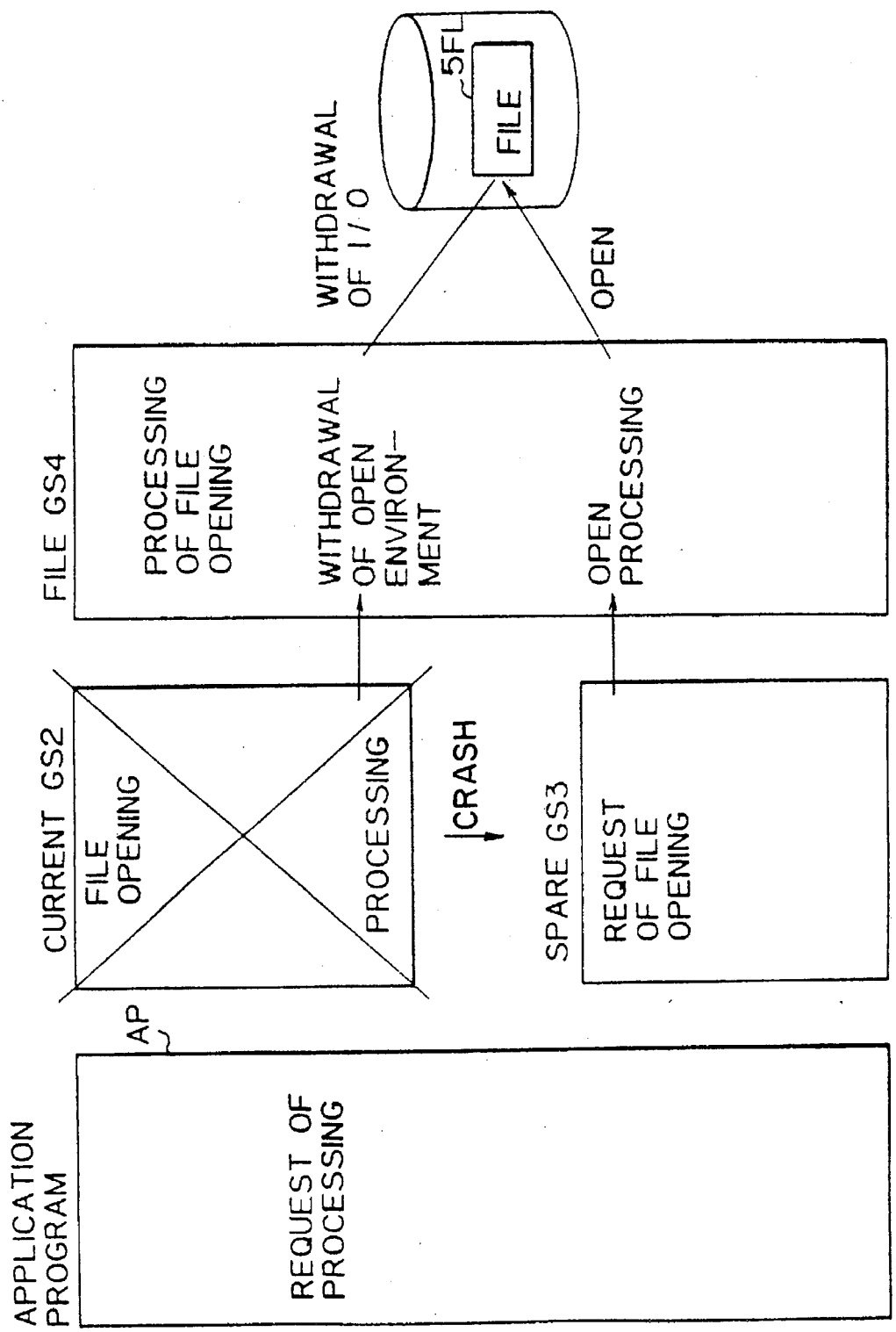
FIG. 17 is a view explaining the processing operation when, the crush occurs in the current GS2.

FIG. 17 is a view for explaining processing operation when the crash occurs in the current GS2. When the crash of the current GS2 is detected by a supervisor (in this case, a supervisor corresponds to the nuclear program 4 in FIG. 8), the processing request is transferred from the current GS2 to the spare GS3 and the file is opened by the file GS4. In the normal crash processing operation, the supervisor transmits the message of request for withdrawing the file opening environment to the file GS4, and the file GS4 performs the withdrawal of the file opening environment as to the current GS2 based on the message from the supervisor. In general, the withdrawing operation of the file opening environment in the file GS4 is simultaneously performed with the file opening request in the spare GS3. Accordingly, when the file opening request is issued from the spare GS3 to the file GS4 before the withdrawing operation is completed in the file GS4, the competition of the request occurs in the file FL so that the file GS4 outputs an "open error" to the spare GS3.

Figure 18:
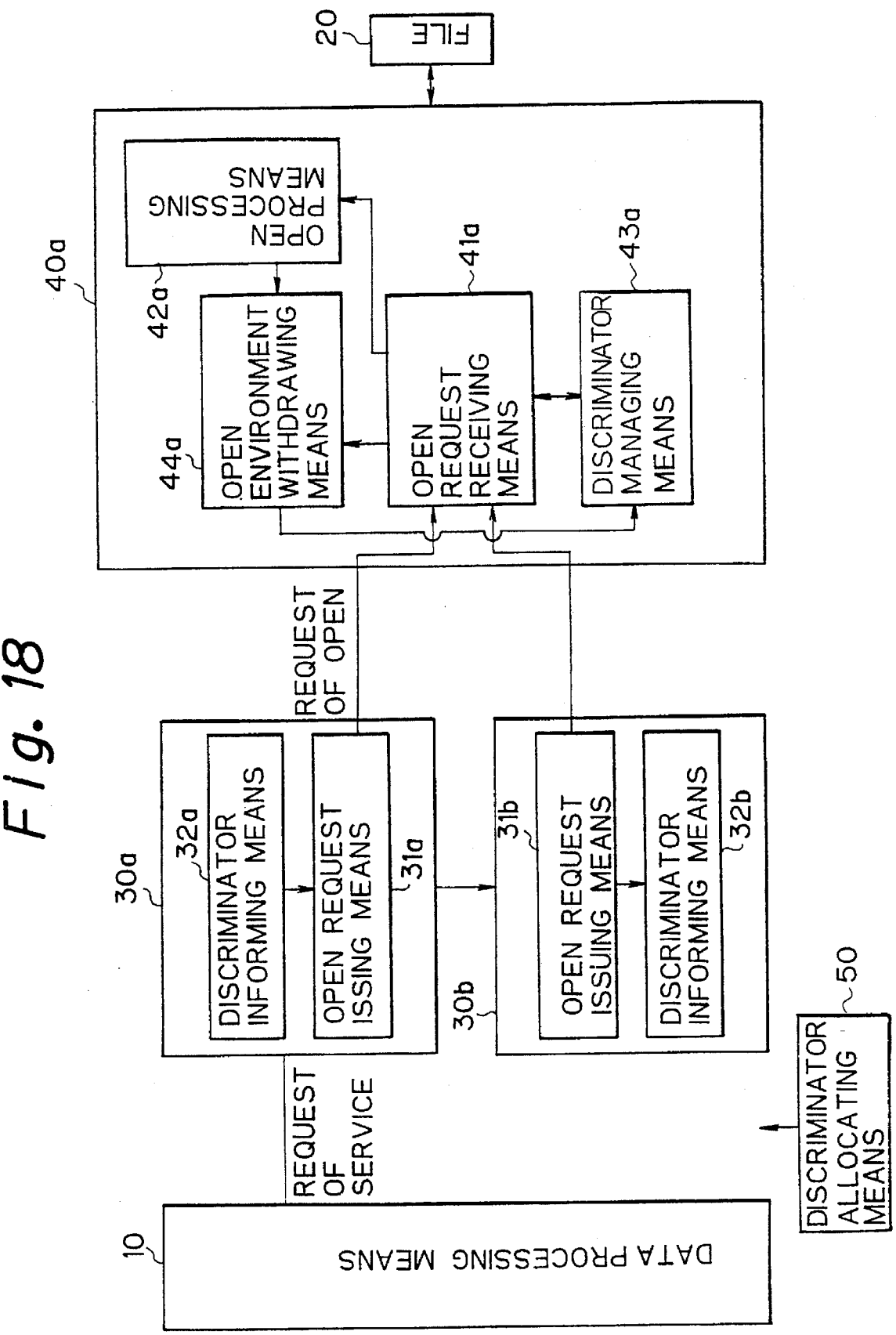
FIG. 18 is a schematic block diagram of an issue processing system according to another aspect of the present invention.

FIG. 18 is a schematic block diagram of an issue processing system according to another aspect of the present invention. In FIG. 18., reference number 10 denotes a data processing means, 20 a file, 30a a current service producing means, 30b a spare service producing means; 40a a current access processing means, 40b a spare access processing means, and 50 a discriminator allocating means.

The file 20 manages data necessary for the data processing operation in the data processing means 10. The current service producing means 30a is started in response to the request of the service from the data processing means 10, and produces the predetermined service to the data processing means 10. In general, a plurality of service producing means 30a are provided in the system. The spare service producing means 30b is provided for transferring the processing from the current service producing means 30a when the crash occurs in the current service producing means 30a. The access processing means 40a is started in response to the request of the opening of the file from the current/spare service producing means 30a and 30b, and performs the service of the resource management in the file 20. The discriminator allocating means 50 uniformly allocates the discriminator to each current service producing means 30a, and also allocates the discriminator to the corresponding spare service producing means 30b.

As shown in the drawing, the service producing means 30a has an opening request issuing means 31a and a discriminator informing means 32a. The opening request issuing means 31a issues the opening request of the file 20 to the access processing means 40a. The discriminator informing means 32a informs the discriminator allocated by the discriminator allocating means 50 to the access processing means 40a when the opening request is issued from the opening request issuing means 31a.

The access processing means 40a has an opening request receiving means 41a, an opening processing means 42a, a discriminator managing means 43a, and an opening environment withdrawal means 44a. The opening request receiving means 41a receives the file opening request issued from the opening request issuing means 31a. The opening processing means 42a performs the opening processing to the file 20. The discriminator managing means 43a manages the discriminator, which is informed from the discriminator informing means 32a, until the withdrawal of the file opening environment is completed. The opening environment withdrawing means 44a withdraws the file opening environment already provided.

In the present invention, the discriminator informing means 32a informs the discriminator allocated by the discriminator allocating means 50 to the access processing means 40a when the opening request issuing means 31a issues the file opening request to the access processing means 40a. When the opening request receiving means 41a receives the file opening request and the discriminator from the opening request issuing means 31a, the opening request receiving means 41a starts the opening processing means 42a and registers the discriminator into the discriminator managing means 43a. The opening processing means 42a sets the file opening environment therein, issues an I/O command to the file 20, and refers to the content of the file 20.

The discriminator managing means 43a manages the discriminator until the processing at the opening processing means 42a is finished and the withdrawal of the file opening environment is completed. In the above steps, when the crash is detected in the current service producing means 30a, the processing is transferred from the current service producing means 30a to the spare service producing means 30b. In the above transfer operation, when the opening request issuing means 31b must issue the file opening request to the access processing means 40a, the discriminator informing means 32b informs the discriminator allocated by the discriminator allocating means 50 to the access processing means 40a.

When the opening request receiving means 41a receives the file opening request from the spare service producing means 30b, the opening request receiving means 41a searches the discriminator managing means 43a so as to determine whether or not the same discriminator as informed from the spare service producing means 30b is provided therein.

When the opening request receiving means 41a detects that the same discriminator is not managed in the discriminator managing means 43a, the opening request receiving means 41a starts the opening processing means 42a so as to perform the file opening request from the spare service producing means 30b. When the opening request receiving means 41a detects that the same discriminator is managed in the discriminator managing means 43a, the opening request receiving means 41a judges whether the withdrawal command of the file opening environment, which is transmitted from a supervisor, is input yet from the supervisor. In this case, the opening request receiving means 41a immediately starts the opening environment withdrawing means 44a to forcibly withdraw the file opening environment from the opening environment withdrawing means 44a.

As explained above, in the present invention, when the spare service producing means 30b issues the file opening request to the access processing means 40a, the access processing means 40a judges whether or not the file opening environment, which is already set in the discriminator managing means 43a in response to the file opening request from the spare service producing means 30a, is withdrawn. When the file opening environment is not yet withdrawn, the withdrawal is forcibly performed in the opening environment withdrawing means 44a so that it is possible to prevent an opening error in the data processing system.

Figure 19:
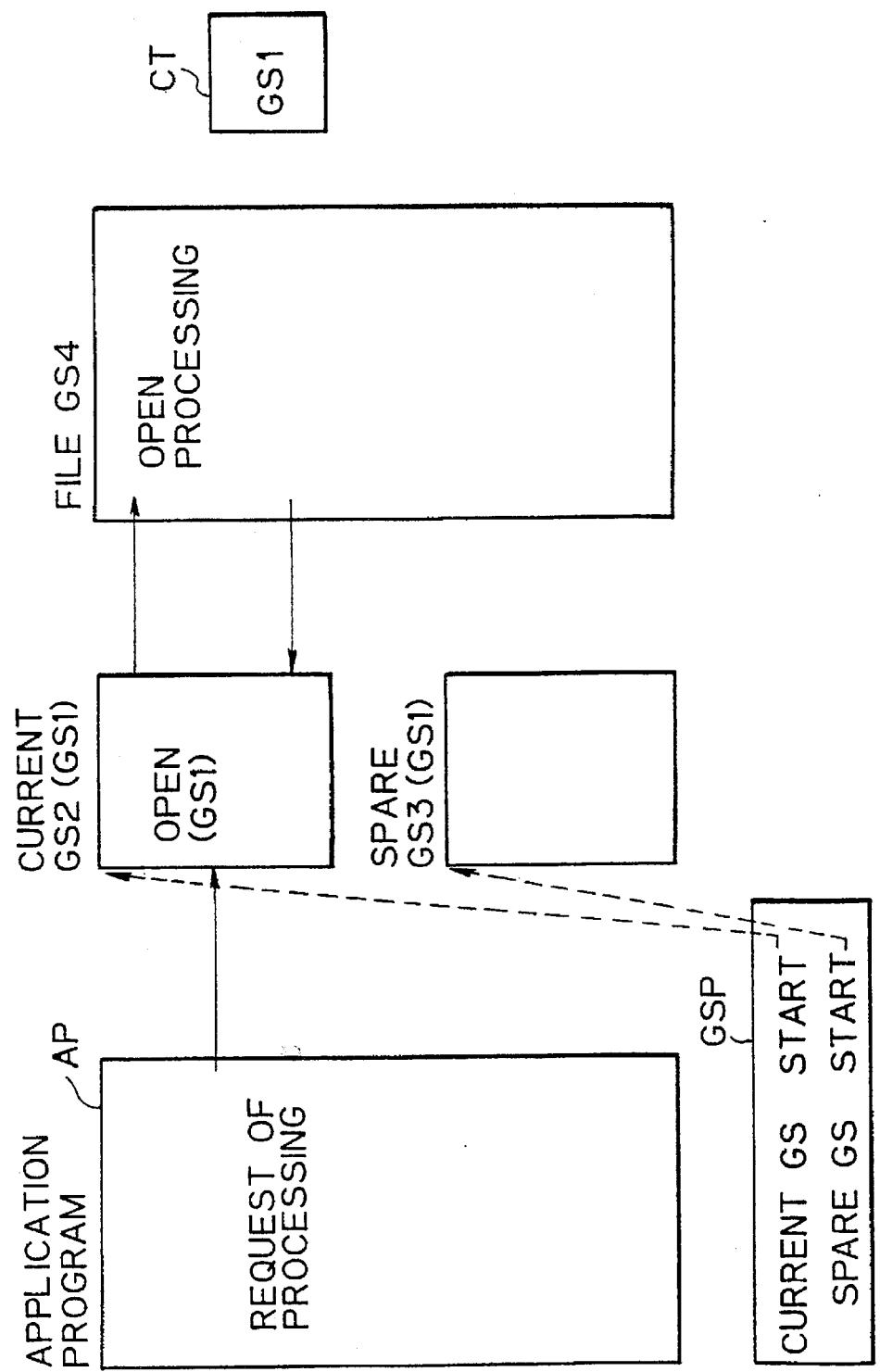
FIG. 19 is a schematic block diagram according to one embodiment of the second aspect of the present invention shown in FIG. 18.

FIG. 19 is a schematic block diagram according to one embodiment of the second aspect of the present invention Shown in FIG. 18. In FIG. 19, the same reference letters as used in FIG. 16 are attached to the same components in this drawing. GS1 denotes a discriminator, CT denotes a control table, and GSP denotes a global service program for managing a start-up of the global service program. The control table CT for storing discriminators is provided in memory area in the file GS4 to manage the file opening environment.

The GSP is provided for sorting the current GS2 and the spare GS3. Further, the GSP allocates the discriminator to the current GS2 when starting the current GS2, and also allocates the same discriminator as that of the current GS2 to the spare GS3 when starting the spare GS3. Accordingly, the discriminator GS1 is allocated to the current GS2, and also allocated to the spare GS3. The current GS2 and the spare GS3 inform the allocated discriminator to the file GS4 when issuing the file opening request to the file GS4.

Figure 20:
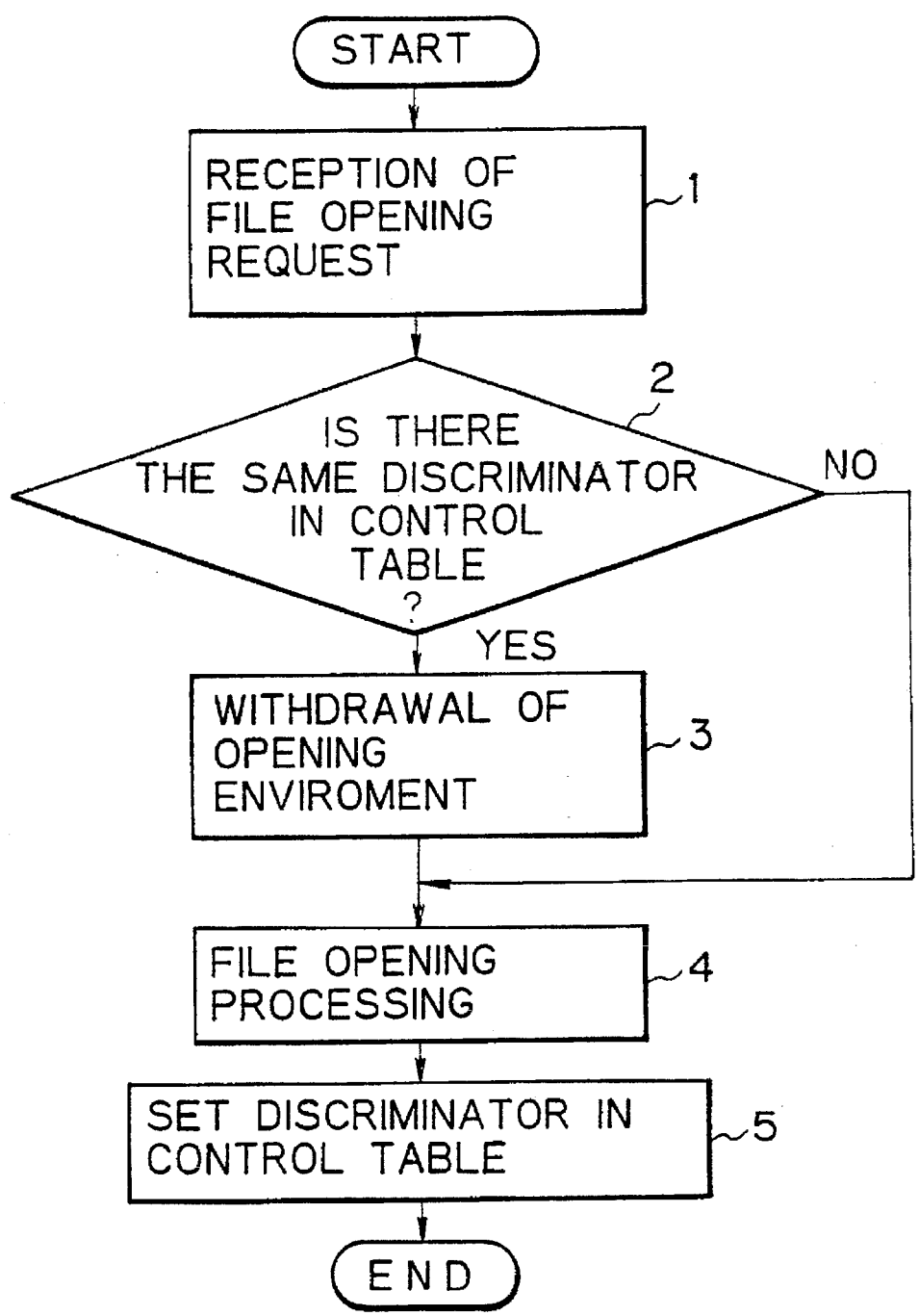
FIG. 20 is a flowchart for explaining the processing operation in the file GS4.

FIG. 20 is a flowchart for explaining the processing operation in the file GS4. In FIG. 20, first, the file GS4 receives the file opening request and the discriminator (step 1). Next, the file GS4 judges whether the same discriminator as received above is already set in the control table CT (step 2).

When the same discriminator is set in the control table CT (YES) (i.e., when the file opening request at the step 1 indicates the request from the spare GS3), the file GS4 forcibly withdraws the file opening environment and the I/O command (step 3).

When the same discriminator is not set in the control table CT (NO) (i.e., when the file opening request at the step 1 indicates the request from the current GS2, or when the file opening request indicates the request from the spare GS3 after the opening environment Of the current GS2 is already withdrawed), the file GS4 performs the opening process (step 4). The file GS4 sets the received discriminator in the control table (step 5). Accordingly, when the crash does not occur in the current GS2, the discriminator of the current GS2 in the control table CT is held until the access processing to the file is completed.

FIG. 21 is a view for explaining the processing operation according to the present invention. As shown in the drawing, when the file opening request is issued from the spare GS3, the file GS4 forcibly withdraws the file opening environment which is set in response to the file opening request from the current GS2. Accordingly, it is not necessary to output the open error from the file GS4 to the spare GS3.

We claim:

1. An issue processing system for a right to use a resource in a data processing system having a global service program based on a fault-tolerant method, and which system comprises a current processing server and a spare processing server corresponding to the current processing server, each of the processing servers performing a predetermined data processing function request by a client, the issue processing system comprising:

a nuclear program, in communication with the current processing server and the spare processing server, issuing a transfer command to transfer the predetermined data processing function to the spare processing server in response to a crash of the current processing server and issuing a right to use a resource to the processing servers; and a current resource management server, in communication with said nuclear program, acquiring from said nuclear program the right to use the resource and issuing to the processing server a corresponding right to use the resource, and further comprising:

re-transmission examination means for examining a message comprising discriminator data, requesting usage of the resource, from the processing server and for determining whether the message is a re-transmitted message, based on the discriminator data and which discriminator data indicates the right to use the resource and comprises multi-request identification (ID) discriminator data and request count discriminator data, a value of said multi-request identification (ID) discriminator data indicating the current processing server and the spare processing server corresponding to the current processing server, and a value of said request count discriminator data being updated for each request for the right to use the resource made by one of the current processing server and the spare processing server corresponding to the current processing server;

registration issue means, coupled to the re-transmission examination means, for acquiring the right to use the resource in response to the message, for registering the right to use the resource in the nuclear program, and for issuing the corresponding right to use the resource to the processing server;

discriminator addition means for adding the discriminator data, of the message requesting the right to use to be issued, to the right to use the resource when the right to use the resource is registered in the nuclear program; and right to use examination means, coupled to said re-transmission examination means and to said discriminator addition means, for examining whether the right to use is already registered, based on a previous message, in the nuclear program by referring to the discriminator data added to the right to use when said re-transmission examination means determines that the message is the re-transmitted message, wherein, if said right to use examination means judges that the right to use is already registered, the registered right to use is invalidated, and a new right to use is registered into the nuclear program by the registration issue means and a corresponding new right to use is issued to the processing server.

2. An issue processing system in for a right to use a resource in a data processing system having a global service program based on a fault-tolerant method, and which system comprises a current processing server and a spare processing server corresponding to the current processing server, each of the processing servers performing a predetermined data processing function request by a client, the issue processing system comprising:

a nuclear program, in communication with the current processing server and the spare processing server, issuing a transfer command to transfer the predetermined data processing function to the spare processing server in response to a crash of the current processing server and issuing a right to use a resource to the processing servers; and a current resource management server, in communication with said nuclear program, acquiring from said nuclear program the right to use the resource and issuing to the processing server a corresponding right to use the resource, and further comprising:

re-transmission examination means for examining a message comprising discriminator data, requesting usage of the resource, from the processing server and for determining whether the message is a re-transmitted message, based on the discriminator data and which discriminator data indicates the right to use the resource and comprises one-to-one discriminator data requesting use of the resource and re-transmission count discriminator data counting the number of re-transmission requests for the resource, wherein said re-transmission examination means includes means for determining whether the message is the re-transmitted message based on the re-transmission count discriminator data;

registration issue means, coupled to the re-transmission examination means, for acquiring the right to use the resource in response to the message, for registering the right to use the resource in the nuclear program, and for issuing the corresponding right to use the resource to the processing server;

discriminator addition means for adding the discriminator data, of the message requesting the right to use to be issued, to the right to use the resource when the right to use the resource is registered in the nuclear program; and right to use examination means, coupled to said re-transmission examination means and to said discriminator addition means, for examining whether the right to use is already registered, based on a previous message, in the nuclear program by referring to the discriminator data added to the right to use when said re-transmission examination means determines that the message is the re-transmitted message, wherein, if said right to use examination means judges that the right to use is already registered, the registered right to use is invalidated, and a new right to use is registered into the nuclear program by the registration issue means and a corresponding new right to use is issued to the processing server.

3. An issue processing system as claimed in claim 1, wherein said system further comprises multi-discriminator means for requesting usage of the same resource further comprising:

means for determining the request count discriminator data which indicates a number of issues of the multi-request ID discriminator data.

4. An issue processing system for a right to use a resource in a data processing system having a global server program based on a fault-tolerant method, the issue processing system comprising:

current service producing means for issuing a file opening request comprising discriminator data, said discriminator data comprising a multi-request identification (ID), and for performing a predetermined data processing function;

spare service producing means for issuing the file opening request comprising the discriminator data comprising the multi-request identification (ID), and for performing the predetermined data processing function;

data processing means, in communication with the current service processing means, for requesting the predetermined data processing function;

a supervisor, in communication with the current service processing means and the spare service processing means, for issuing a transfer command transferring the predetermined data processing function from the current service producing means to the spare service producing means in response to a crash of the current service producing means;

discriminator allocating means, in communication with the current service producing means and the spare service producing means, for allocating the discriminator data, which further comprises a counter and which defines a file opening environment to the current and spare service producing means;

access processing means, in communication with the current service producing means and the spare service producing means, for establishing the file opening environment therein and for managing the discriminator data until the file opening environment is withdrawn, the discriminator data being received from the current service producing means at the time of the file opening request therefrom, and further, if the discriminator data being received from the spare service producing means at the time of the file opening request is the same as the discriminator data being managed in the access processing means, the file opening environment defined by the discriminator data is withdrawn; and each of said current service producing means and said spare service producing means further comprising:

discriminator informing means for presenting the discriminator data allocated by the discriminator allocating means to the access processing means for processing a file access when the one of the current and the spare service producing means issues the file opening request.

5. An issue processing system as claimed in claim 4, wherein the discriminator allocating means includes means for allocating identical discriminator data, comprising the multi-request identification (ID) and counter, to the current service producing means and to the spare service producing means when the current service producing means and the spare service producing means are started.

6. An apparatus determining a right to use a data processing resource requested by a client in a message identifying the client and comprising a message ID, said apparatus comprising:

resource request data comprising the message ID and a counter, said message ID corresponding to a data processing request by the client;

processing servers, coupled to the client, requesting allocation of the data processing resource to the client by transmitting the resource request data, said processing servers comprising:

a current processing server receiving the message from the client and requesting allocation of the data processing resource to the client by transmitting the resource request data, and a spare processing server updating the counter and requesting allocation of the data processing resource to the client, by transmitting the resource request data, if the current processing server becomes unavailable;

a resource management server, coupled to the processing servers, receiving the resource request data and determining whether the resource request data was transmitted by one of the current processing server and the spare processing server, based on the counter; and a nuclear program storing the right to use the data processing resource, wherein:

the resource management server allocates the right to use the data processing resource to the current processing server if the current processing server is requesting allocation of the data processing resource and the data processing resource is not allocated, and the resource management server allocates the right to use the data processing resource to the spare processing server if the spare processing server is requesting allocation of the data processing resource, the data processing resource is allocated to the current processing server and the nuclear program is requesting that the resource management server cancel the right to use the resource allocated to the current processing server, and the current processing server is unavailable.

* * * * *

UNITED STATES PATENT AND TRADEMARK OFFICE
CERTIFICATE OF CORRECTION

PATENT NO. : 5,666,479
DATED : September 9, 1997
INVENTOR(S) : KASHIMOTO et al.

Page 1 of 2

It is certified that error appears in the above-identified patent and that said Letters Patent is hereby corrected as shown below:

Title Page, In the Abstract, line 21, change "sue" to --use--.

Col. 1, line 62, change "1" to --,--.

Col. 2, line 33, change "form" to --from--.

Col. 3, line 43, change "a" to --an--;
line 51, after "server" (both occurrences) insert --,--;
line 56, change ";" to --,--.

Col. 4, line 18, change "9″" to --9'--.

Col. 7, line 32, change "a view" to --views--;
line 60, after "issued" insert --,--.

Col. 9, line 10, change "NO1" to --NO--.

Col. 11, line 7, change ";" to --,--.

Col. 12, line 46, change "Shown" to --shown--;

Col. 13, line 10, change "Of" to --of--;
line 11, change "withdrawed" to --withdrawn--.

UNITED STATES PATENT AND TRADEMARK OFFICE
CERTIFICATE OF CORRECTION

PATENT NO. : 5,666,479
DATED : September 9, 1997
INVENTOR(S) : KASHIMOTO, et al

It is certified that error appears in the above-identified patent and that said Letters Patent is hereby corrected as shown below:

Col. 14, line 21, delete "in".

Signed and Sealed this

Third Day of February, 1998

Attest:

Attesting Officer

BRUCE LEHMAN

Commissioner of Patents and Trademarks